(12) United States Patent
Guynn et al.

(10) Patent No.: US 10,710,180 B2
(45) Date of Patent: Jul. 14, 2020

(54) METHOD AND APPARATUS TO MONITOR AND SHUT DOWN PRODUCTION SAW

(71) Applicant: HOLLYMATIC CORPORATION, Countryside, IL (US)

(72) Inventors: Victor Guynn, Romeoville, IL (US); David Baarman, Fennville, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 54 days.

(21) Appl. No.: 15/906,402

(22) Filed: Feb. 27, 2018

(65) Prior Publication Data

US 2018/0243848 A1    Aug. 30, 2018

Related U.S. Application Data

(60) Provisional application No. 62/464,746, filed on Feb. 28, 2017.

(51) Int. Cl.
*B23D 59/00* (2006.01)
*F16P 3/14* (2006.01)
*B23D 55/06* (2006.01)
*B27G 19/06* (2006.01)
*B27B 13/14* (2006.01)
(Continued)

(52) U.S. Cl.
CPC ......... *B23D 59/001* (2013.01); *B23D 55/065* (2013.01); *B27B 13/14* (2013.01); *B27G 19/06* (2013.01); *F16P 3/12* (2013.01); *F16P 3/14* (2013.01); *F16P 3/142* (2013.01); *A22C 17/0006* (2013.01); *Y10T 83/707* (2015.04); *Y10T 83/7264* (2015.04)

(58) Field of Classification Search
CPC .. Y10T 83/707–7264; B23D 55/00–10; B23D 55/065; B23D 59/001; F16P 3/00–18; A22C 17/0006; B27B 13/14; B27G 19/06
USPC .............................. 83/788–820; 474/166–199
See application file for complete search history.

(56) References Cited

U.S. PATENT DOCUMENTS 1,916,903 A    7/1933    Wine
2,954,061 A    9/1960    Stordal
(Continued)

FOREIGN PATENT DOCUMENTS

WO    2017/008128 A1    1/2017

OTHER PUBLICATIONS

International Search Report dated May 31, 2018 in application No. PCT/US2018/020094.
(Continued)

*Primary Examiner* — Laura M Lee
(74) *Attorney, Agent, or Firm* — Sughrue Mion, PLLC

(57) ABSTRACT

A saw with a monitoring and safety system that utilizes vision and sensors designed to provide user feedback on safety and training. The saw having a wheel formed of an anodized main body with a non-anodized surface extending along the circumference of the groove of the wheel. The saw having low inertial energy design to stop the blade without mechanically grabbing the blade assuring multiple points of safety detection and triggering. The saw having an automatic guard to protect the user from slipping and hitting the blade even when the saw is not running. The saw being connected to a cloud based system that enables a safer ecosystem and cross statistic sharing of safety parameters.

20 Claims, 24 Drawing Sheets

(51) Int. Cl.
*F16P 3/12* (2006.01)
*A22C 17/00* (2006.01)

(56) References Cited

U.S. PATENT DOCUMENTS

| | | | |
|---|---|---|---|
| 3,888,148 A | 6/1975 | Weissman | |
| 4,117,295 A * | 9/1978 | Beach | C21D 9/60 |
| | | | 219/155 |
| 4,141,142 A | 2/1979 | Karubian | |
| 4,463,638 A * | 8/1984 | Fortin | B23D 55/02 |
| | | | 83/564 |
| 4,785,522 A * | 11/1988 | Biro | B22D 19/06 |
| | | | 164/103 |
| 5,272,946 A * | 12/1993 | McCullough | B27B 13/14 |
| | | | 192/129 A |
| 5,302,157 A * | 4/1994 | Ogura | F16H 55/44 |
| | | | 164/481 |
| 7,000,514 B2 * | 2/2006 | Gass | B23D 59/001 |
| | | | 192/129 R |
| 9,927,796 B2 * | 3/2018 | Gass | B23D 55/00 |
| 2005/0049831 A1 | 3/2005 | Lilly | |
| 2012/0090439 A1 * | 4/2012 | Butler | B23D 59/006 |
| | | | 83/68 |
| 2014/0290455 A1 * | 10/2014 | Gass | B27G 19/06 |
| | | | 83/62.1 |
| 2016/0152452 A1 | 6/2016 | Barnet et al. | |
| 2018/0243848 A1 * | 8/2018 | Guynn | A22C 17/0006 |

OTHER PUBLICATIONS

Written Opinion from the International Searching Authority dated May 31, 2018 in application No. PCT/US2018/020094.

* cited by examiner 130
135

Safety Performance Rating

| Operator | Training Trips | Operation Hours | Safety Trips | Glove trips | Safety Rating | Safety Trips Total | Safety Numbers | | |
|---|---|---|---|---|---|---|---|---|---|
| | | | | | | | Safety Trips Ratio | Hours to safety ratio | High Risk Ratio |
| Operator 1 | 19 | 2000 | 12 | 1 | 135 | 32 | 4.2779 | 270.4810 | 31.5789 |
| Operator 3 | 21 | 2080 | 14 | 1 | 154 | 36 | 4.3084 | 251.2569 | 32.0513 |
| Operator 5 | 2 | 1756 | 8 | 4 | 94 | 14 | 6.7143 | 842.1633 | 227.7904 |
| Operator 6 | 3 | 2260 | 4 | 0 | 33 | 7 | 4.7143 | 1522.0408 | 0.0000 |
| Operator 7 | 43 | 1832 | 21 | 4 | 295 | 68 | 4.3382 | 116.8772 | 218.3406 |
| Operator 8 | 10 | 2040 | 4 | 1 | 64 | 15 | 4.2667 | 580.2667 | 49.0196 |

Operator Performance Rating

| Operator | Expert Ref. (S,E,T) | Operator score (S,E,T) | % of expert | Diff from avg. | Safety trips | User measured data | | | Speed Population distributions | | | Energy Population distributions | | | Transitions Population distributions | | |
|---|---|---|---|---|---|---|---|---|---|---|---|---|---|---|---|---|---|
| | | | | | | Speed | Energy | Transitions | Tails | Ave-rage | Tips | Tails | Ave-rage | Tips | Tails | Ave-rage | Tips |
| Operator 1 | 96 | 66 | 68.75% | 86.36% | 3 | 6 | 7 | 9 | 2 | 6 | 9 | 2 | 4 | 11 | 4 | 9 | 12 |
| Operator 2 | 117 | 75 | 64.10% | 92.00% | 3 | 7 | 8 | 10 | 3 | 5 | 10 | 4 | 8 | 15 | 6 | 10 | 14 |
| Operator 3 | 164 | 100 | 60.98% | 96.00% | 4 | 7 | 8 | 10 | 5 | 7 | 12 | 4 | 8 | 14 | 6 | 9 | 15 |
| Operator 4 | 235 | 160 | 68.09% | 93.75% | 5 | 8 | 12 | 12 | 4 | 8 | 12 | 6 | 11 | 19 | 7 | 11 | 16 |
| Operator 5 | 282 | 192 | 68.09% | 93.75% | 6 | 8 | 12 | 12 | 5 | 8 | 12 | 7 | 12 | 18 | 6 | 10 | 17 |
| Operator 6 | 350 | 287 | 82.00% | 78.05% | 7 | 10 | 20 | 11 | 6 | 10 | 16 | 8 | 13 | 20 | 5 | 9 | 14 |
| Operator 7 | 84 | 56 | 66.67% | 92.86% | 2 | 14 | 6 | 8 | 4 | 14 | 18 | 2 | 5 | 12 | 3 | 7 | 12 |
| Operator 8 | 90 | 51 | 56.67% | 82.35% | 3 | 6 | 6 | 5 | 2 | 6 | 11 | 2 | 3 | 11 | 1 | 5 | 8 |

FIG. 20

METHOD AND APPARATUS TO MONITOR AND SHUT DOWN PRODUCTION SAW

CROSS REFERENCE TO RELATED APPLICATIONS

The present application claims priority to U.S. Provisional Application No. 62/464,746, filed on Feb. 28, 2017, the contents of which are incorporated herein by reference in their entirety.

BACKGROUND

Technical Field

Embodiments relate to systems, methods, and apparatus for stopping a saw and monitoring a blade that may come into contact with human body parts.

Description of Related Art

Systems, methods, and apparatus for stopping a saw according to embodiments of the disclosure may be applicable to an automatic-stop safety system using motor driven machinery which drives, for example, the blade of a band saw.

Systems in a related art may comprise methods such as detecting the resistance of skin and mechanically thrusting the blade of a saw into a nylon barrier, which in turn stops the blade quickly. The mechanical grabbing of the blade either damages the blade or destroys the blade and this may be undesirable. Other systems may use cameras as a visual means to detect the presence of an operator. Another system may utilize a conductive method based on skin resistance. It should be noted that cutting conductive materials creates issues for such solutions discussed above. For example, cutting conductive materials like aluminum or, as in certain aspects of the present disclosure, meat, raises issues requiring special provisions and consideration. U.S. Pat. No. 7,924,164 B1 issued to Staerzl shows an example of a visual system that monitors a body part and a zone triggering a shut-down event. Although this is a helpful element for training and tracking proximity, it has limitations in the use and potential resolution in a dirty environment where gloves, cameras and equipment can become covered in blood, meat and liquids. It should also be noted that with fast moving parts and actions, reaction times for vision-based systems present a challenging issue.

In a related art, some saws may apply mechanical brakes, or actually grab the blade mechanically and cause damage to the blade.

In a related art, some saws and safety systems use guards and light bars to create safe operating zones. Other systems could be an alarm or emergency stop. However, due to the time to shut down the blade, or due to the speed of reaction, the saw continues to spin and allows many further revolutions of the blade. For example, in a related art automatic stop saw system employing mechanical brakes, the time to stop the saw may be about 0.5 seconds. Thus the saw could cut through a person easily due to its remaining inertia. At present, it may be possible to compensate for operator incompetence with safe and injury free operation, but this generates a new problem. User ratings, training, repetition and equipment become enablers toward the ultimate safety goal. Systems in the related art may have addressed some portions of these elements, but as technology progresses, there lies room for improvement in safer equipment and in the combinations of technology for better outcomes.

Some problems of the related art technologies relate to masking of the image viewed with a camera in a meat-cutting environment. The production environment has many challenges with blood, bone, liquids and color changes for visual recognition of an object. Calibration and set-up may help to ensure proper cleaning and proper operation, but this needs to be part of the solution. This environment also creates issues with conductive materials as meat may have some material properties similar to that of human limbs. This makes it difficult to discern the difference between meat and human limbs when cutting. Blue gloves can cause false triggers when veins are seen in the meat. Yellow gloves are not acceptable due to fat color and false triggers caused by areas of fat in the meat.

Another issue with related art technologies includes repetition and training. Past solutions have not sought to track and train each user for a specific job and rank the propensity for a user to do a given job.

SUMMARY

The present disclosure addresses several matters such as those described above, and other matters not described above. Embodiments of the present disclosure may be considered key solutions to past problems that have been observed and modified for better results in the production environment.

In an embodiment, a machine may comprise a motor, a first wheel coupled to the motor, a second wheel, and a blade. The first wheel and the second wheel may each comprise a first lip and a second lip sandwiching a groove therebetween. The first wheel may be formed of an anodized main body with a non-anodized surface extending along the circumference of the groove of the first wheel, and the blade may be wrapped around the first wheel and the second wheel such that the blade is positioned within the groove of the first wheel and within the groove of the second wheel. The blade may contact the non-anodized surface of the first wheel.

In an embodiment, a safety saw system may comprise a motor; a first wheel coupled to the motor; a second wheel; a blade; a detector; and a controller. The first wheel and the second wheel may each comprise a first lip and a second lip sandwiching a groove therebetween. The first wheel may be formed of an anodized main body with a non-anodized surface extending along a circumference of the groove of the first wheel. The blade may be wrapped around the first wheel and the second wheel such that the blade is positioned within the groove of the first wheel and within the groove of the second wheel. The blade may contact the non-anodized surface of the first wheel. The controller may be configured to stop the motor in response to an input to the detector indicating an abnormal condition of the safety saw system. The safety saw system may further comprise a dynamic braking device which stops the motor in response to the input. The dynamic braking device may stop the blade in 70 ms or less. The motor may be coupled to the first wheel through a direct drive. The detector may comprise a sensor configured to detect a conductive glove making contact with the blade. The conductive glove may have a resistance lower than body resistance or resistance of meat. The safety saw system may further comprise a saw guard that protects the user from the blade.

In an embodiment, the anodized main body of the first wheel and the non-anodized surface of the first wheel may be formed of aluminum. Further, the second wheel may be formed of an anodized main body with a non-anodized surface extending along the circumference of the groove of the second wheel, and the blade may contact the non-anodized surface of the second wheel. The anodized main body of the second wheel and the non-anodized surface of the second wheel may be formed of aluminum. The blade may comprise a base part and a toothed part, the toothed part being for cutting. The non-anodized surface of the first wheel may be formed with a width that is equal to or less than a width of the base part, and a side of the base part may be in contact with the non-anodized surface such that the side of the base part may be in contact with the non-anodized surface along an entire width or along a partial width of the base part. Alternatively, the non-anodized surface of the first wheel may be formed with a width that is greater than a width of the base part, such that side of the base part may be in contact with the non-anodized surface along an entire width of the base part, and a side of the toothed part may be in contact with the non-anodized surface at least along a partial width of the toothed part.

In an embodiment, there may be a method of stopping a saw, the method comprising stopping a motor in response to an input to a detector indicating an abnormal condition of the saw. The method may further comprise determining a conductive glove is on a body of a user by reading body resistance. The method may further comprise identifying regions of travel of the glove; determining regions of safety movement; and stopping the motor in response to the glove entering the predetermined region, the predetermined region being apart from the regions of safety movement. The method may further comprise calculating a plurality of safety rankings corresponding to a plurality of users by ID, wherein the safety rankings are based on safety parameters measured by a controller. The method may further comprise dropping a saw guard that protects the user from the blade.

DESCRIPTION OF DRAWINGS

A brief description of some representative drawings is provided as follows.

FIG. 19 illustrates information of zones and performance that may be recorded by a safety saw system for performance and safety rating purposes, FIG. 20 illustrates information of zones and performance that may be recorded by a safety saw system for performance and safety rating purposes.

DESCRIPTION OF EMBODIMENTS

Figure 1:
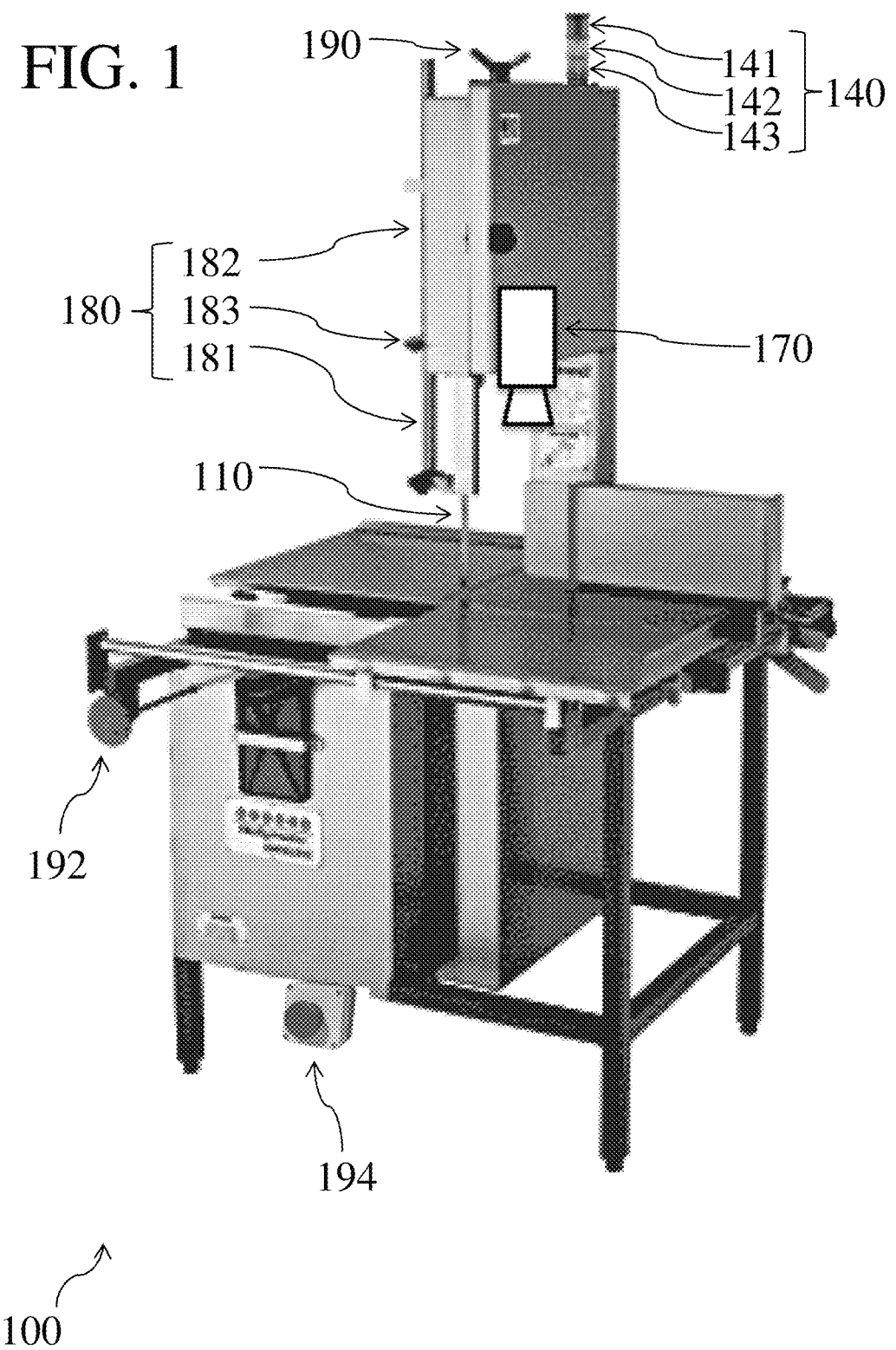
FIG. 1 illustrates a perspective view of a safety saw.

In order to prevent harm or damage it is important to stop the blade as fast as possible. It is desirable to stop the blade without destroying the blade. In the inventor's earlier designs, the inventor found that if the blade was stopped faster than 0.1 seconds, it would cause the blade to slip on the wheel because the top wheel is not being braked or controlled electrically. This would cause the blade to travel around 8 feet in the length direction of the blade after the lower wheel was stopped. Thus, the blade continued to bite into the material and could potentially cause damage and dulling to the blade. It is desired to stop both wheels almost simultaneously without any damage or dulling to the blade. Thus, the inventor endeavored to decrease the stopping time to under 0.05 second from 1200 RPM to 0 RPM.

The inventor endeavored to minimize brake time and post-stopping travel of the blade. This was accomplished by, for example, altering the system inertia by changing the material of the upper and lower wheels to aluminum. Changing and reducing materials to aluminum in both wheels took energy out of the system, thereby allowing faster braking. Also, by configuring the upper wheel and the lower wheel as low-inertia wheels, the total stopping time of the saw can be further reduced. Further, by employing a heavy-duty bi-directional electric motor with such characteristics that are described below, the driven lower wheel can be stopped rapidly such that the total stopping time of the saw can be further reduced.

However, when stopping time is reduced, there arises a tendency for the blade to slip on the surfaces of the upper and lower wheels. For example, since a related art saw may decelerate a blade from running condition to rest in about 0.5 s, related art components are ill equipped to handle the high demands of a rapid stop. A related art saw may employ steel wheels as the upper and lower wheels which have very smooth surfaces contacting the blade. Thus, when a rapid stop is attempted using components as in the related art, the slippage of the blade may negate the benefits of stopping the saw more rapidly.

In at least one embodiment of the disclosure, each wheel may further include a non-anodized aluminum groove such that the groove has a higher coefficient of friction compared to other parts of the wheel. Accordingly, the friction between a saw blade and the wheels can be increased to avoid slippage of the saw blade. Each wheel may further include lips on either side of the groove for accommodating a saw blade so it is less likely that the saw blade will detach from the wheels under violent action of a rapid stop event.

In a related art stop saw system employing mechanical brakes, the time to stop the saw may be about 0.5 seconds. However, in an embodiment of the present disclosure, because the machinery is driven by a specialized motor system, the safety saw system is able to stop the machinery in a time of less than 0.05 seconds. For example, in an embodiment of the disclosure, a motor 150, which is directly coupled to a lower wheel 120 of the safety saw 100 through a direct drive, allows for precise control of the angular position, velocity, and acceleration of the wheel and can thus stop the wheel nearly instantaneously.

In an embodiment of the disclosure, a system does not mechanically grab the blade, thus damage to the blade can be avoided. Furthermore, resetting the machine after a hard stop may take only 5 seconds to restart.

In an embodiment of the disclosure, the user may wear two sets of gloves. The first set of gloves may keep the hands warm and dry, while also being conductive and acting as an electrode. The user may be verified by the measurement of impedance between the two gloves, thus verifying to a safety saw system that the user is present and the system is connected when a signal is provided to the safety saw system. The user may also be verified with an optical barcode on the glove or contact ID in the glove conductive path. This unit may send an ID code to the saw, and the saw may be connected to a database, which may be for example, provided in a cloud computing environment. User statistics, processing speed and safety statistics may be retained and measured over time. The body impedance can be used to recognize specific people for characterization, but an additional identification code may be sent electronically or optically from the glove to the machine control upon connection. In an embodiment of the present disclosure, certain embodiments relate to the monitoring and feedback of safety parameters and employee safety rankings. Those operators that operate within safety margins with a healthy safety margin may be qualified as safe operators.

In an embodiment, there may be provided a safety saw. FIG. 1 illustrates one embodiment of a safety saw 100 which has a blade 110 and a tensioner 190. The safety saw 100 may be a band saw used for cutting meat products. A camera 170 may be provided on the safety saw 100 which may monitor a safety zone. The camera 170 is, for example, a high speed camera having a refresh rate of 10 ms. The safety saw 100 may also comprise an emergency stop 192 or an emergency kick stop 194 to be pressed by a user to stop the blade 110 in emergency situations. The safety saw 100 may also comprise status indicators 140 that include, for example, a red light 141, a yellow light 142, and a green light 143.

The safety saw 100 may also comprise an automatic blade guard 180 that includes a guard 181, an air cylinder 182, and a height setting device 183. Many injuries happen even when a saw is stopped in preparation for a job. The automatic blade guard 180 prevents a hazard before starting the safety saw 100 and when a stop condition is enabled.

Figure 2:
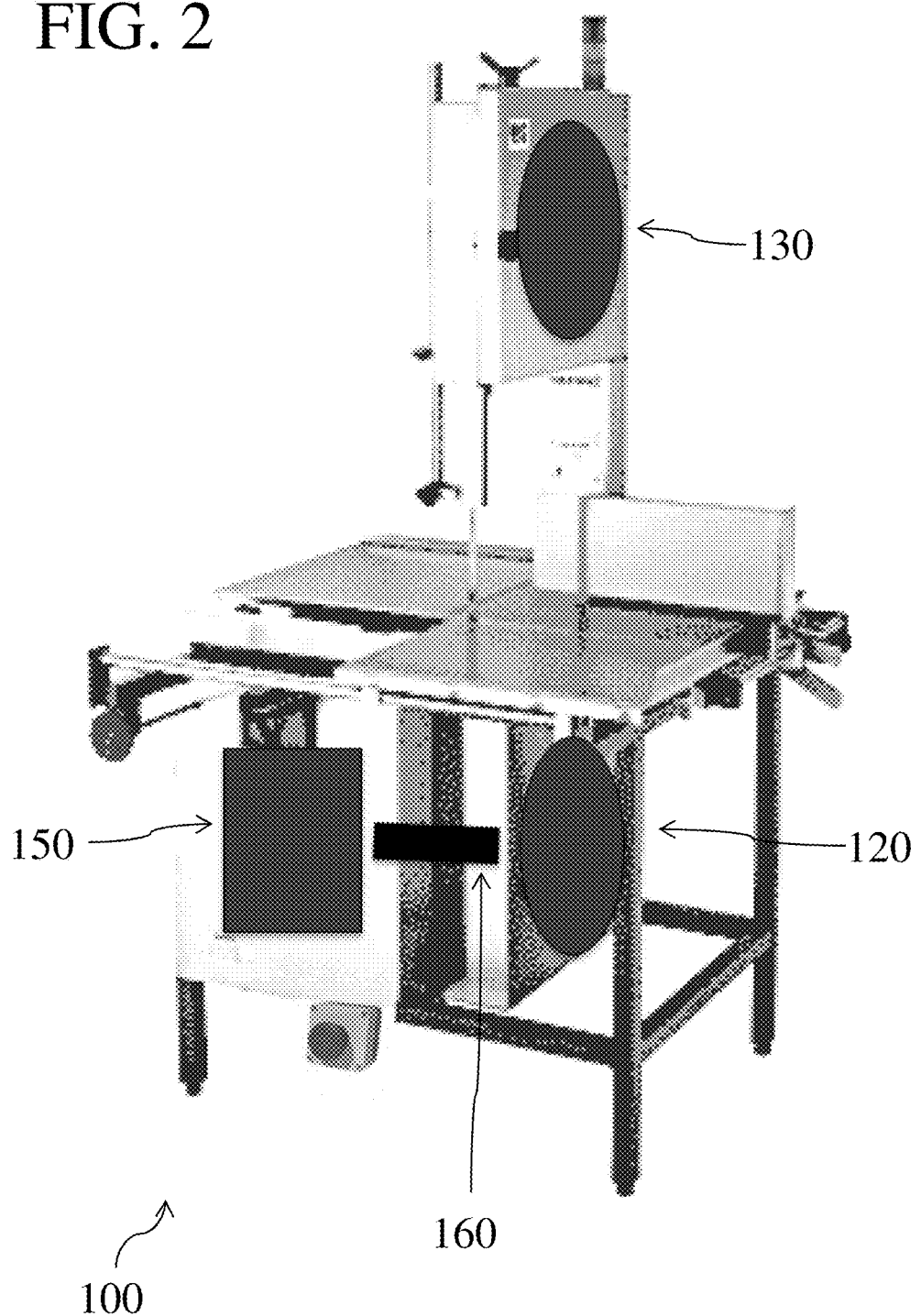
FIG. 2 illustrates a perspective view of the safety saw of FIG. 1, modified to illustrate internal features of the safety saw.

As illustrated in FIG. 2, the safety saw 100 internally comprises an upper wheel 130, a lower wheel 120, a motor 150, and a shaft 160. The motor 150 powers the lower wheel 120 which is connected by the shaft 160. The blade 110 is formed in a band shape and is wrapped around the upper wheel 130 and the lower wheel 120.

Figure 3:
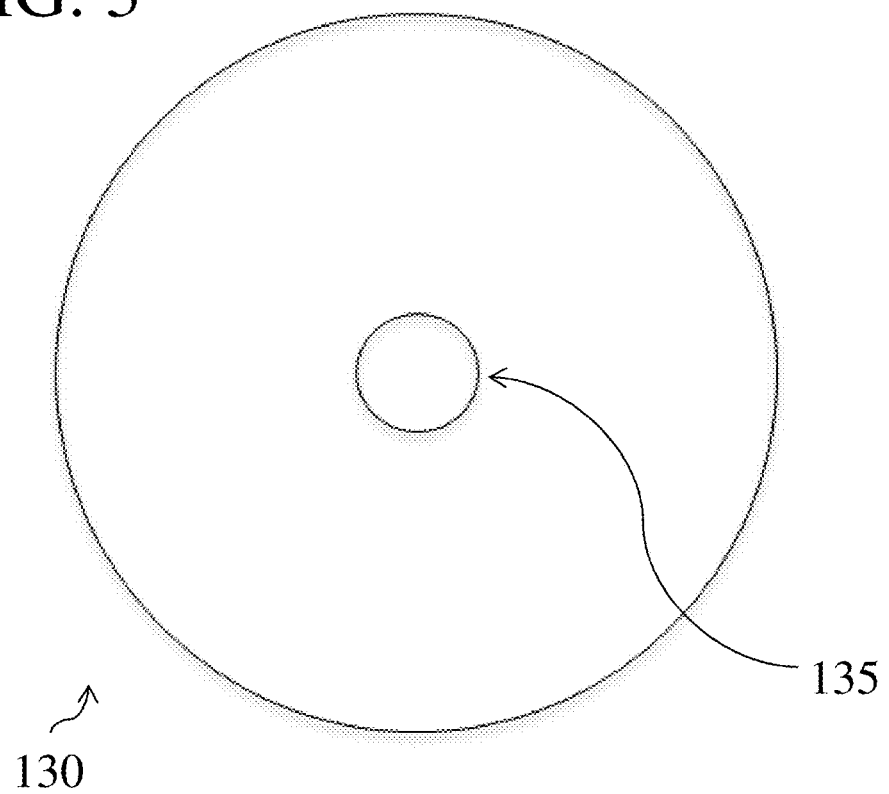
FIG. 3 illustrates a front view of an upper wheel of a safety saw of an embodiment.
Figure 4:
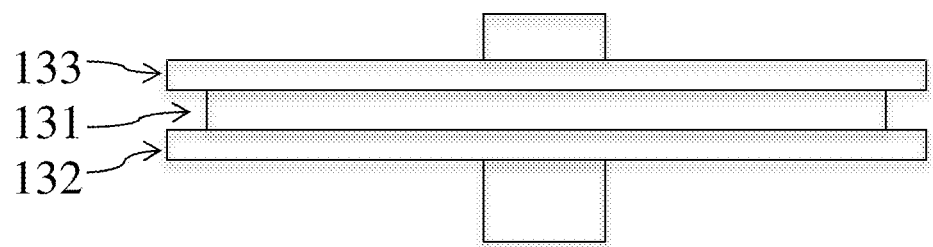
FIG. 4 illustrates a side view of an upper wheel of a safety saw of an embodiment.

As illustrated in FIG. 3, the upper wheel 130 may be formed in a circular shape with an axel 135. As illustrated in FIG. 4, the upper wheel 130 may comprise a groove 131 for accommodating the blade 110, and lips 132 and 133 for preventing the blade 110 from coming off the upper wheel 130.

The groove 131 may be formed by a material such as non-anodized aluminum, while other parts of the upper wheel 130 may be formed by anodized aluminum. For example, the main body of the wheel 130 may be formed by anodization while the surface of the groove 131 is masked so that only the groove 131 is non-anodized. Anodization affects the surface roughness of a material, thus, by employing the processing as above, the groove 131 can be made to have a higher coefficient of friction compared to other parts of the wheel 130. The lower wheel 120 may be formed with substantially the same structure as the upper wheel 130, as described above.

Figure 5:
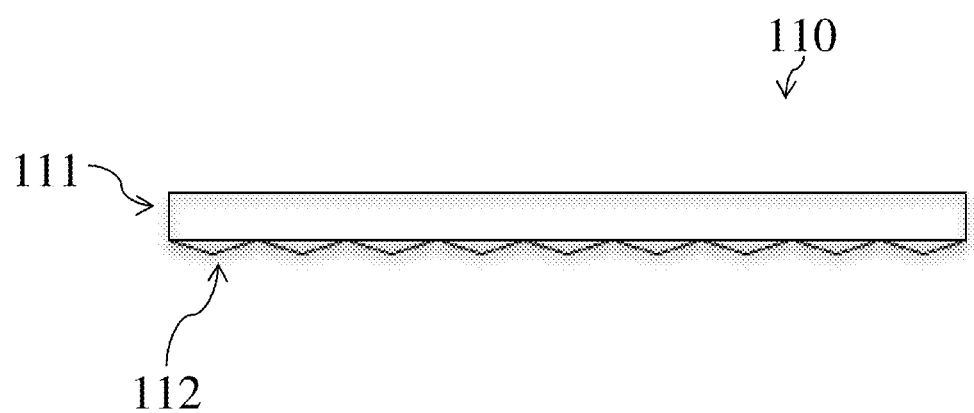
FIG. 5 illustrates a front view of a blade of a safety saw of an embodiment.

Furthermore, by configuring the upper wheel 130 and the lower wheel 120 as wheels formed from anodized aluminum, with a masked section to thereby form a strip of non-anodized aluminum at the groove 131, the friction between the blade 110 and the wheels 120, 130 can be increased. In some embodiments, there may be a strip of a non-anodized section extending around the circumference of the wheels 120, 130. The strip may be as wide as the blade 110, and not necessarily span the full width between lip 132 and lip 133. In another embodiment, the strip may be narrower than the blade 110, such that the strip spans only a base part 111 of the blade 110 and does not cause increased wear to the toothed part 112, as shown in FIG. 5. In yet another embodiment, the strip may be narrower than the base part 111 of the blade 110.

Additionally, by employing the blade 110 wrapped around the upper wheel 130 and the lower wheel 120, each comprising lips 132, 133 on either side of a groove 131 for accommodating the saw blade 110, it is less likely that the saw blade will detach from the wheels 120, 130 under the violent action of a rapid-stop event.

In an embodiment, the wheels 120, 130 formed from anodized aluminum having a non-anodized section at the groove 131 may weigh, for example, 10 pounds or less. In an embodiment, the wheels 120, 130 may weigh 7 pounds. Comparatively, a wheel made of steel or cast iron may weigh 21 pounds or more.

Figure 6:
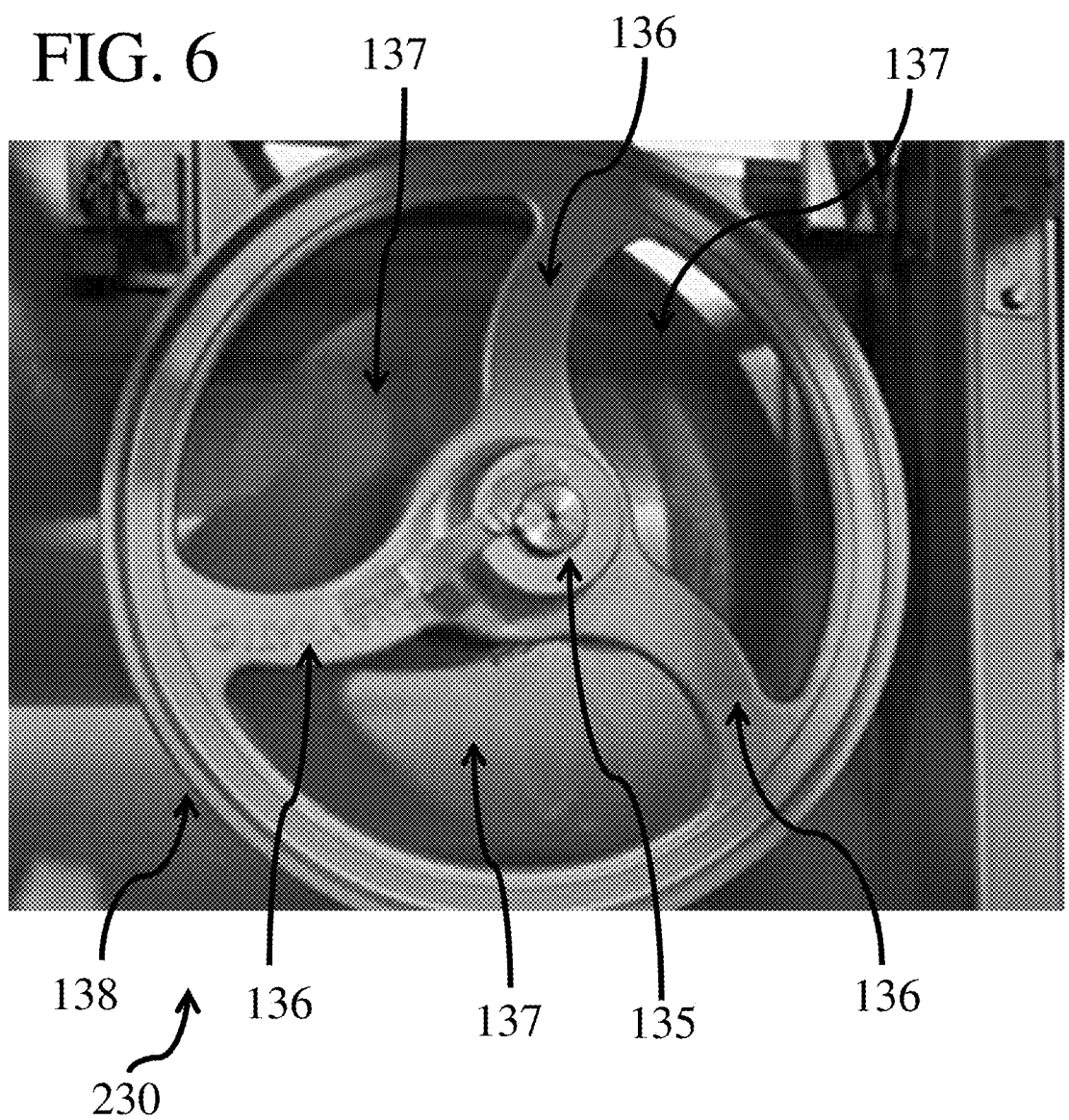
FIG. 6 illustrates a front view of a reduced inertia wheel of a safety saw of an embodiment.

FIG. 6 illustrates an embodiment of a wheel 230, that may be used as an upper wheel 130 or lower wheel 120, to accomplish low inertia drive and prevent blade slippage. The wheel 230 may comprise a shaft 13, spokes 136, holes 137, and a rim 138. The groove 131 and lips 132 and 133 may be included in the rim 138 of the wheel 230. The number of spokes 137 and holes 137 may be selected to reduce inertia.

In particular, inertia may be reduced and blade grip may be improved by using an anodized aluminum wheel as a flywheel with the blade contact area masked to the bare aluminum for better grip. The moment of inertia of each wheel may be less than $0.2$ kg m$^2$, and preferably may be less than $0.1$ kg m$^2$. In an embodiment, the calculated moment of inertia of each wheel is $0.091$ kg m$^2$. In contrast to the above embodiments, hard steel cast wheels that are used as flywheels may have greater blade slippage when stopping fast.

The tendency for the blade 110 to slip during a rapid stop may also be reduced by increasing the tension of the blade 110 through the tensioner 190 illustrated in FIG. 1. This is because, as friction depends on a force applied normal to the surface to which an object is adhered, friction between the wheels 120, 130 and the blade 110 may be increased by increasing tension of the blade 110 through the tensioner 190. In an embodiment, it is preferred that the tension of the blade 110 is set to at least 360 pounds. The tension is more preferably set to at least 400 pounds.

Figure 7:
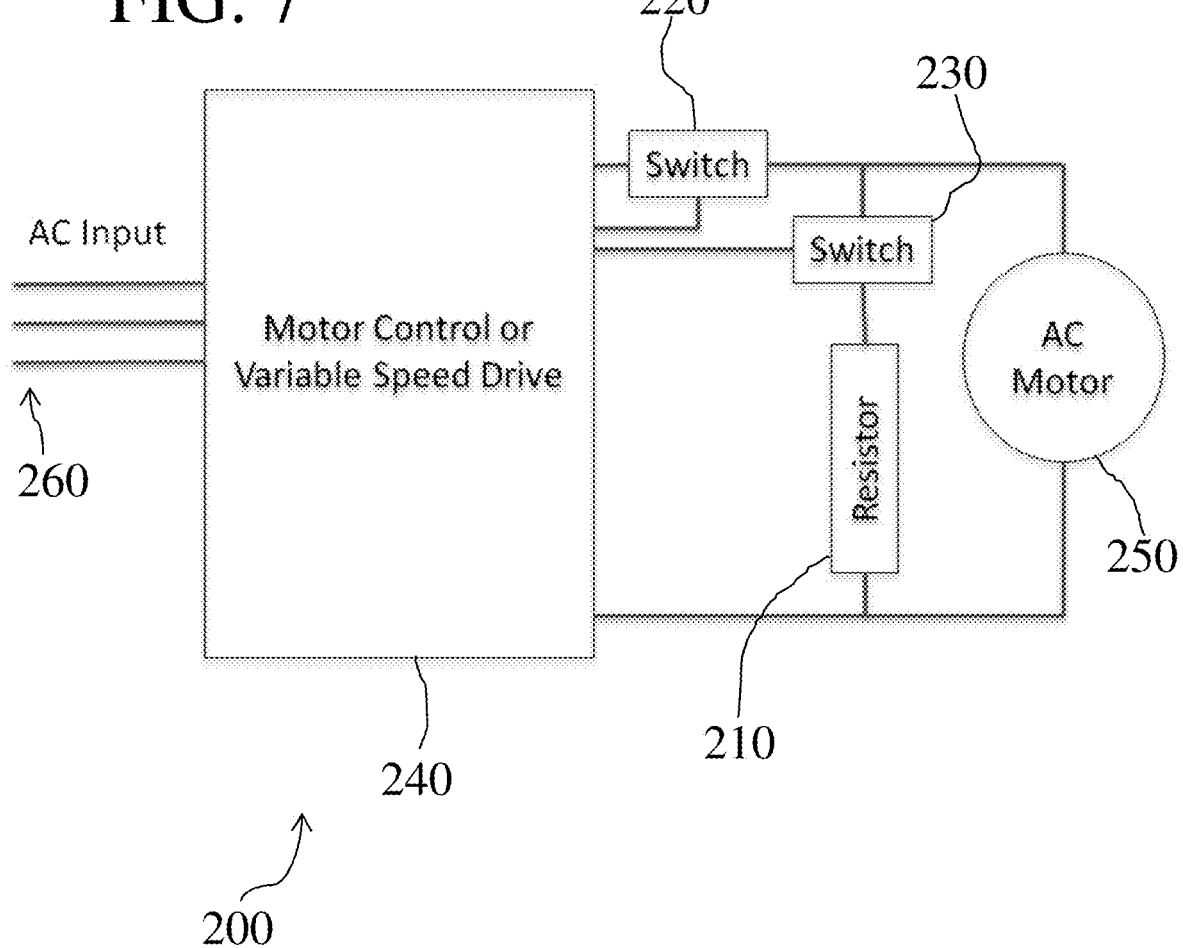
FIG. 7 illustrates an embodiment of the dynamic brake.

Furthermore, eliminating the gear box and going to a direct drive motor may also reduce inertia and reduce stopping times. With reference to FIG. 7, a dynamic braking system 200 is described in which brake performance can be achieved as illustrated in FIG. 8 and FIG. 9.

Dynamic breaking system 200 comprises, for example, an AC input 260, a motor control or variable speed drive 240, switches 220, 230, load resistor 210, and AC motor 250. The motor control or variable speed drive 240 receives power supplied from the AC input 260 and controls the AC motor 250.

Figure 8:
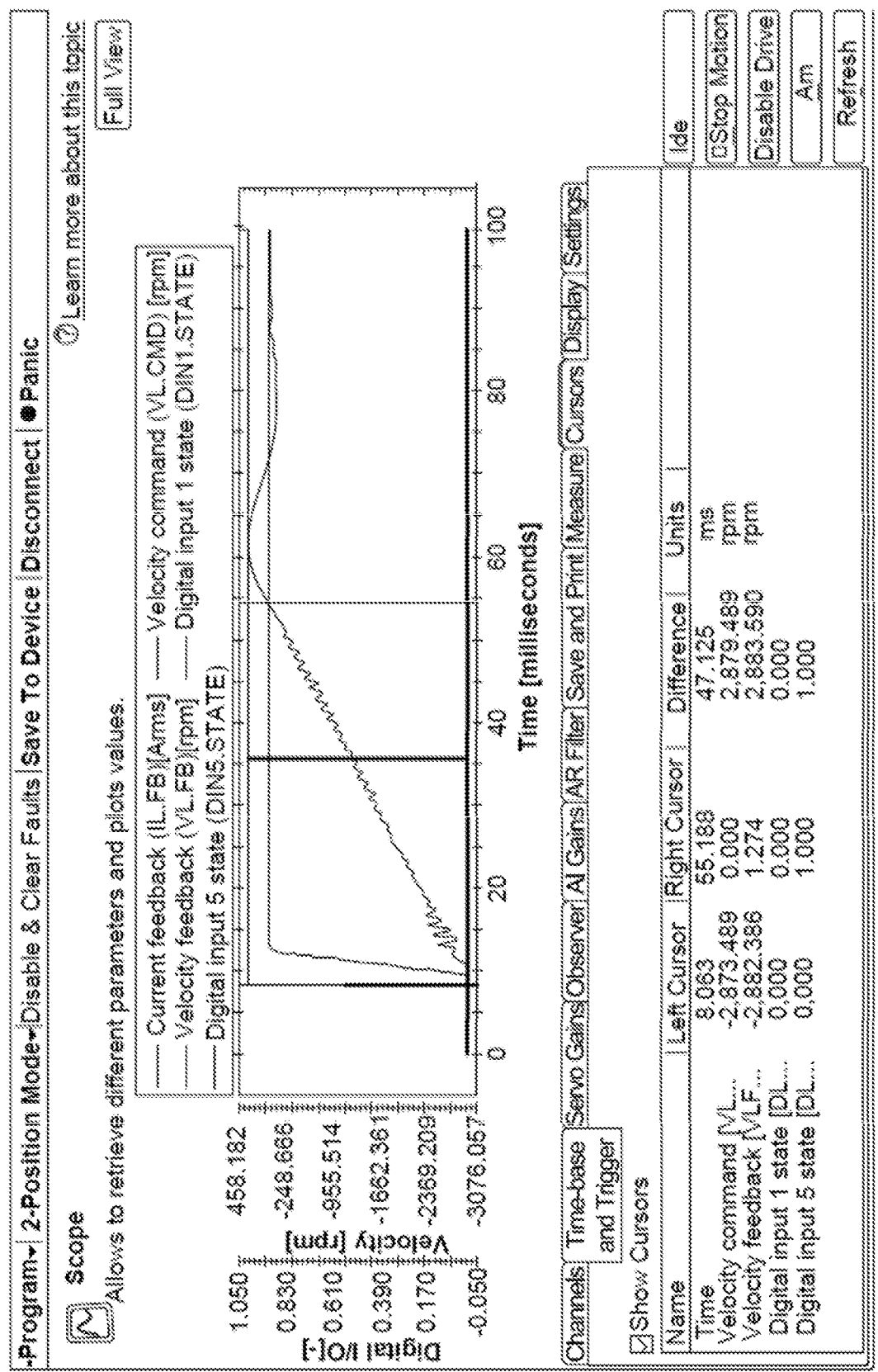
FIG. 8 illustrates a graph showing breaking performance of a band saw of an embodiment in which stopping of the band saw is initiated by a stop condition detected via a camera.
Figure 9:
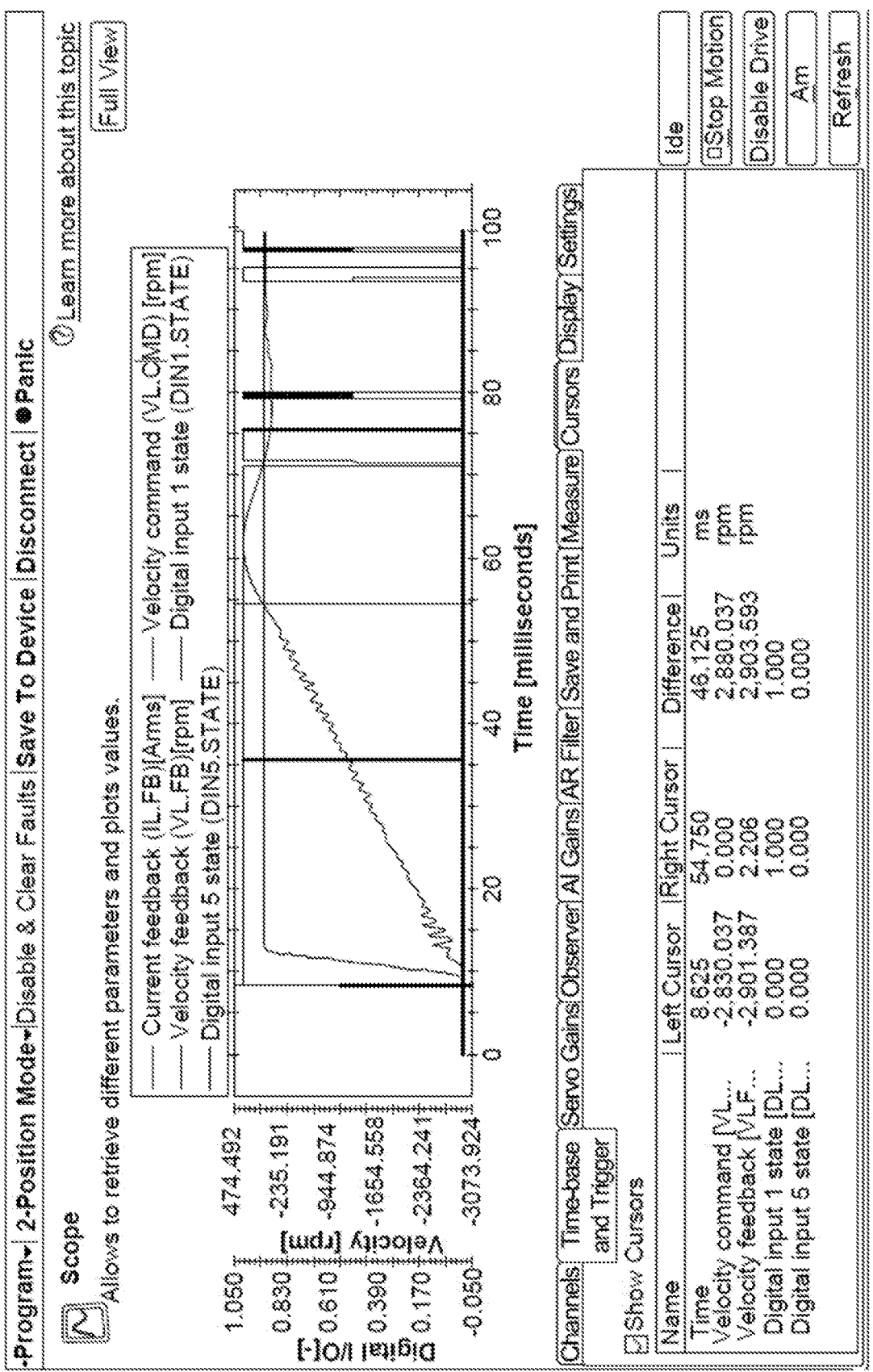
FIG. 9 illustrates a graph showing breaking performance of a band saw of an embodiment in which stopping of the band saw is initiated by a stop condition detected via electrically conductive gloves.

FIG. 8 illustrates a graph of breaking performance of the dynamic braking system 200 used in an embodiment of the safety saw 100 in which stopping of the safety band saw 100 is initiated by a stop condition detected via a camera 170, and FIG. 9 illustrates breaking performance of an embodiment of the safety saw 100 in which stopping of the band saw is initiated by a stop condition detected via electrically conductive gloves. As illustrated in FIGS. 8-9, an upper wheel 130 and lower wheel 120 of embodiments of the disclosure may have braking times of around 55 ms.

Saw stop calculations and steps are listed below and require no mechanical blade grabbing as related art technologies have used in efforts to achieve fast braking. It should be noted that operational up time and blade damage are concerns with mechanical grabbing of the blade.

Stopping time is a critical function of the system. It was assumed that 0.1 second would be plenty fast enough that an operator would not be injured. Some AC motors, permanent magnet motors, and servo motors, could not achieve a machine stop time of under 0.1 second. However, after calculations and experimentation by the inventor, a solution was found with a specific type of motor and gear box. The motor includes very low inertia and the motor and gearbox are able to output enough torque to stop without being damaged in the process.

On nearly all standard gearboxes that can be ordered on the current market, such equipment is offered only with steel shafts. Since the safety saw 100 is direct driven from the output shaft on the gearbox, and the shaft 160 is exposed to wash down and very caustic chemicals, the shaft 160 and carrier assembly should be made from, for example, stainless steel. For example, the parts may be proprietary parts offered by Hollymatic Corporation to meet the inertial specifications. Specifications for saw blade stoppage of an embodiment may be, for example, as given below.

| Saw Stop Travel Calculations | |
|---|---|
| Blade Feet per Minute | 4500 bfpm |
| Conversion | 0.016666667 fps |
| Feet per second | 75 fps |
| Distance per millisecond | 0.075 ft |

| Saw Stop Travel Calculations | |
|---|---|
| Recognition time Max | 14 ms |
| Stop time | 50 ms |
| Max time | 64 ms |
| Max travel at full speed | 4.8 ft |
| Min Travel at full speed | 3.75 ft |
| Over the deceleration curve Max | 2.4 ft |
| Over the deceleration curve Min | 1.875 ft |

Specifications for a dynamic breaking system 200 of an embodiment may be determined, for example, as given below.

Step 1—Determine the Total Inertia $J_T$=Total inertia reflected to the motor shaft, kilogram-meters$^2$, kg-m$^2$, or pound-feet$^2$, lb-ft$^2$ $J_m$=motor inertia, kilogram-meters$^2$, kg-m$^2$, or pound-feet$^2$, lb-ft$^2$ GR=The gear ratio for any gear between motor and load, dimensionless $J_L$=load inertia, kilogram-meters$^2$, kg-m$^2$, or pound-feet$^2$, lb-ft$^2$ (1.0 lb-ft$^2$=0.04214011 kg-m$^2$)

Step 2—Calculate the Peak Braking Power $J_T$=Total inertia reflected to the motor shaft, kg-m$^2$ $\omega$=rated angular rotational speed, N=Rated motor speed, RPM $t_3-t_2$=total time of deceleration from the rated speed to 0 speed, seconds $P_b$=peak braking power, watts (1.0 HP=746 Watts)

Compare the peak braking power to that of the rated motor power, if the peak braking power is greater than 1.5 times that of the motor, then the deceleration time, $(t_3-t_2)$, needs to be increased so that the drive does not go into current limit. Use 1.5 times because the drive can handle 150% current maximum for 3 seconds.

Peak power can be reduced by the losses of the motor and inverter.

Step 3—Calculating the Maximum Dynamic Brake Resistance Value $V_d$=The value of DC bus voltage that the chopper module regulates at and will equal 375 Vdc, 750 Vdc, or 937.5 Vdc $P_b$=The peak braking power calculated in step 2

$R_{db1}$=The maximum allowable value for the dynamic brake resistor

The choice of the Dynamic Brake resistance value should be less than the value calculated in step 3. If the value is greater than the calculated value, the drive can trip on DC bus overvoltage. Remember to account for resistor tolerances.

Step 4—Determine the Minimum Resistance

Each drive with an internal DB IGBT has a minimum resistance associated with it. If a resistance lower than the minimum value for a given drive is connected, the brake transistor will most likely be damaged.

Step 5—Choosing the Dynamic Brake Resistance Value

To avoid damage to this transistor and get the desired braking performance, select a resistor with a resistance between the maximum resistance calculated in step 3 and the minimum resistance of the selected chopper module.

Step 6—Estimating the Minimum Wattage Requirements for the Dynamic Brake Resistor It is assumed that the application exhibits a periodic function of acceleration and deceleration. If $(t_3-t_2)$=the time in seconds necessary for deceleration from rated speed to 0 speed, and $t_4$ is the time in seconds before the process repeats itself, then the average duty cycle is $(t_3-t_2)/t_4$. The power as a function of time is a linearly decreasing function from a value equal to the peak regenerative power to 0 after $(t_3-t_2)$ seconds have elapsed. The average power regenerated over the interval of $(t_3-t_2)$ seconds is $P_b/2$. The average power in watts regenerated over the period $t_4$ is:

$P_{av}$=Average dynamic brake resistor dissipation, in watts
$t_3-t_2$=Elapsed time to decelerate from rated speed to 0 speed, in seconds
$t_4$=Total cycle time or period of process, in seconds
$P_b$=Peak braking power, in watts The Dynamic Brake Resistor power rating in watts that will be chosen should be equal to or greater than the value calculated in step 6.

Step 7—Calculate the Requires Watt-Seconds (Joules) for the Resistor

In order the ensure that the resistors thermal capabilities are not violated, a calculation to determine the amount of energy dissipated into the resistor will be made. This will determine the amount joules the resistor must be able to absorb.

Figure 10:
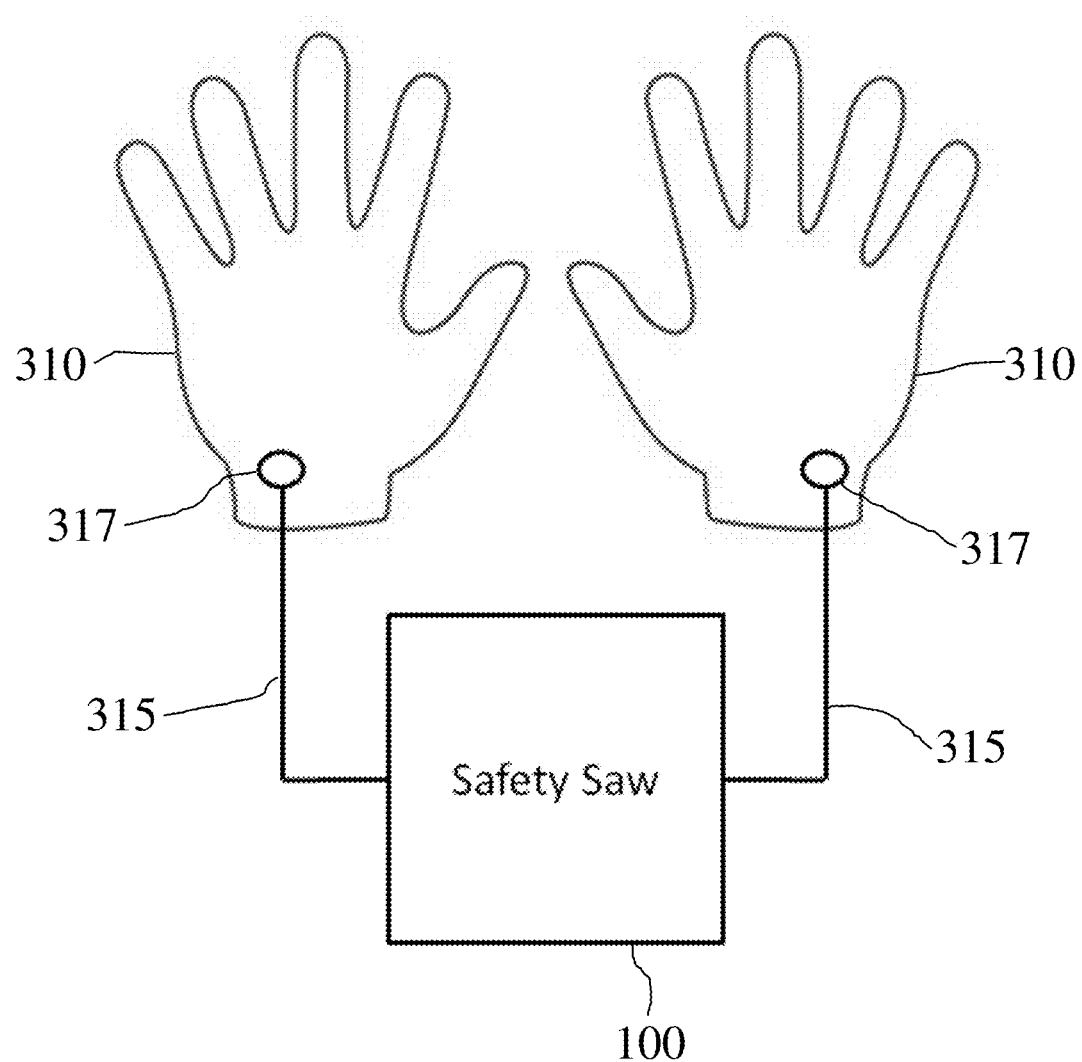
FIG. 10 illustrates an impedance detection glove system of a safety saw system.

$P_{ws}$=Required watt—seconds of the resistor
$t_3-t_2$=Elapsed time to decelerate from $\omega_b$ speed to $\omega_0$ speed, seconds
$P_b$=Peak braking power, watts With reference to FIG. 10, an impedance detection glove system of a safety saw system embodiment that may be used in discerning the present impedance of a human or meat is described.

In an automatic-stop safety saw and stop saw safety system, there involves a safety system for machinery in which some input to a controller triggers the sudden stop of a component of the machinery, for example, a blade of a saw. A concept behind having a controller trigger a sudden stop of a component of the machinery by using an electrically conductive glove is to allow one to a discern a voltage that represents the glove that comes into contact with the ground, and not the meat or wet environments.

In the safety saw 100, the input may be the closure of an electrical circuit caused by physically touching the metallic saw blade 110 with an electrically conductive glove 310. The electrically conductive gloves 310 may comprise interwoven conductive fibers. As illustrated in FIG. 10, the gloves 310 may be connected to a tether 315 via conductor 317, wherein the tether 315 is further connected to the safety saw 100 and thereby completes a circuit with the saw blade 110 when a user of the gloves 310 touches the saw blade 110. Alternatively, the gloves 310 may be connected to a tether 315 via a conductor 317, wherein the tether 315 is attached to the user's clothing (for example, a butcher's smock) and then continues to the safety saw 100. If a user wearing the gloves 310 touches the saw blade 110, the controller causes the saw blade 110 to stop in time so that the user is not severely injured and the safety saw 100 is not damaged.

A concept behind the conductive stop is to allow one to a discern a voltage that represents the glove coming into contact with the ground and not the meat or wet environments.

Figure 11:
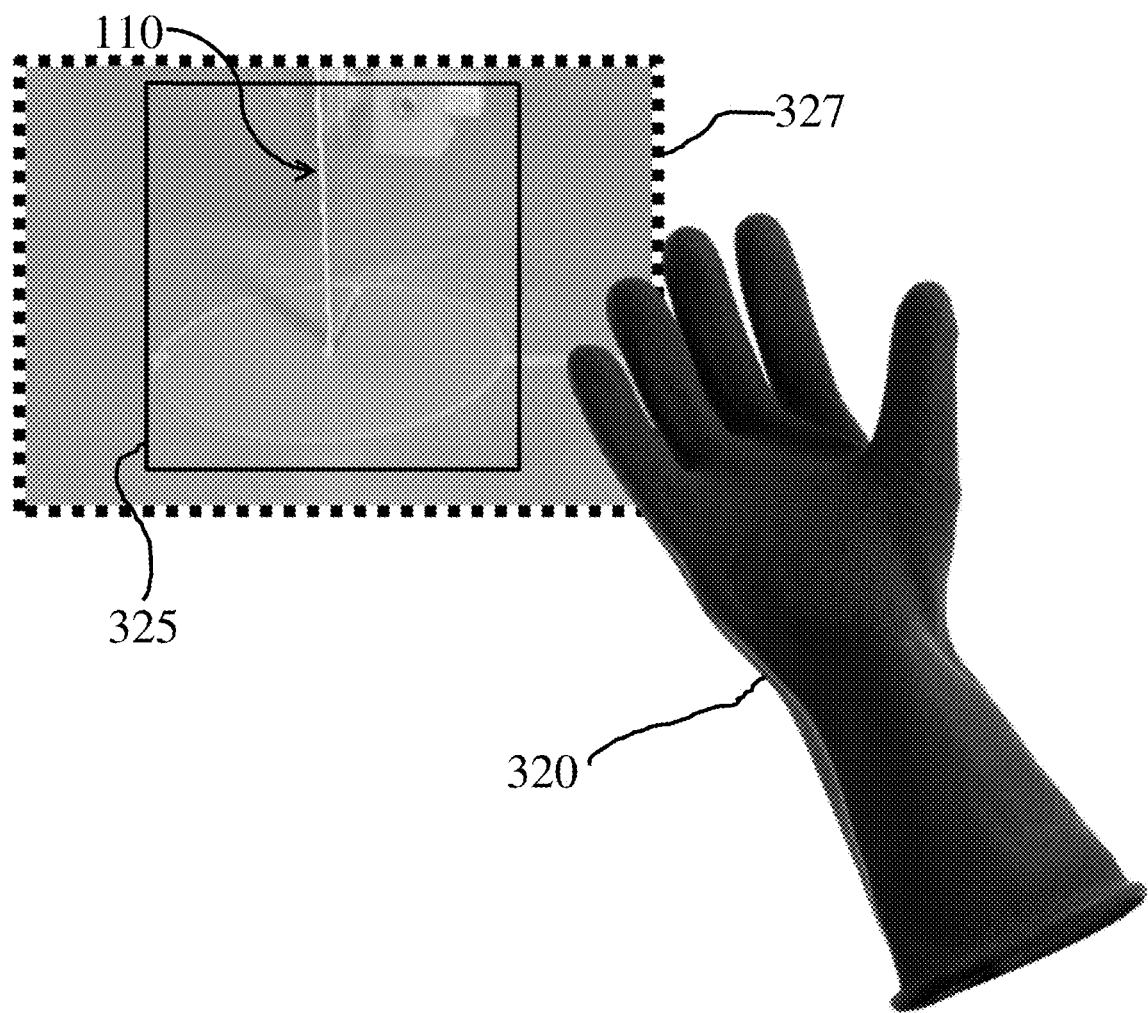
FIG. 11 illustrates a vision system of a safety saw system.

With reference to FIG. 11, a vision system of a safety saw system embodiment is described. The vision system may comprise the camera 170.

In alternative embodiments, the input signal to trigger the automatic-stop may be based on a visual cue, such as monitoring for a colored glove 320 entering within a safety zone 325 of a saw blade 110, as illustrated in FIG. 11. A safety zone 325 may be, for example, a cutting path in a range of 2 inches or less in front of the saw blade. Alternatively, the safety zone 325 may be more than 2 inches from the front of the saw blade 110 and may include any sized area around the saw blade 327. Surrounding the safety zone 235 may be a training zone 327. The colored glove 320 may be green so that it can be reliably distinguished from, for example, fat and veins in a meat product. However, the colored glove 320 may have any color that can be reliably distinguished from a product cut with the saw blade 110.

Figure 12:
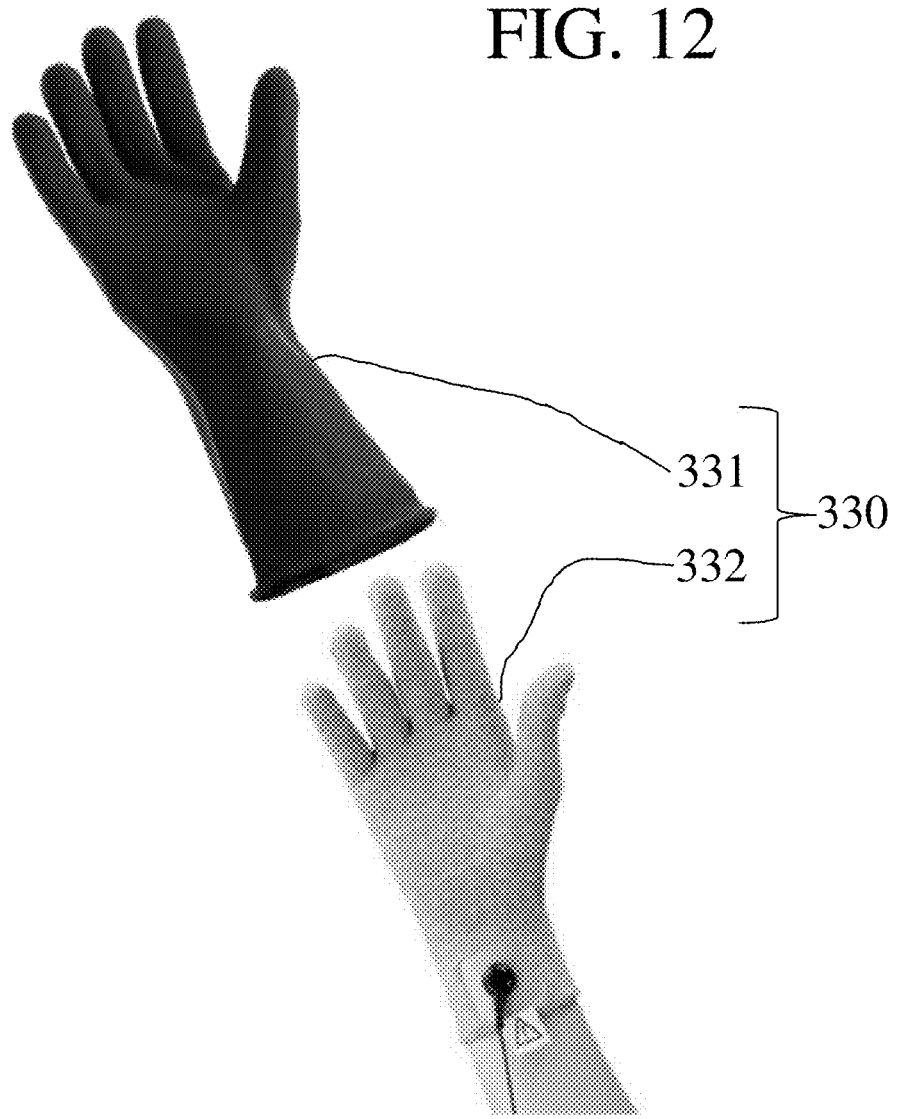
FIG. 12 illustrates gloves of a safety saw system.
Figure 13:
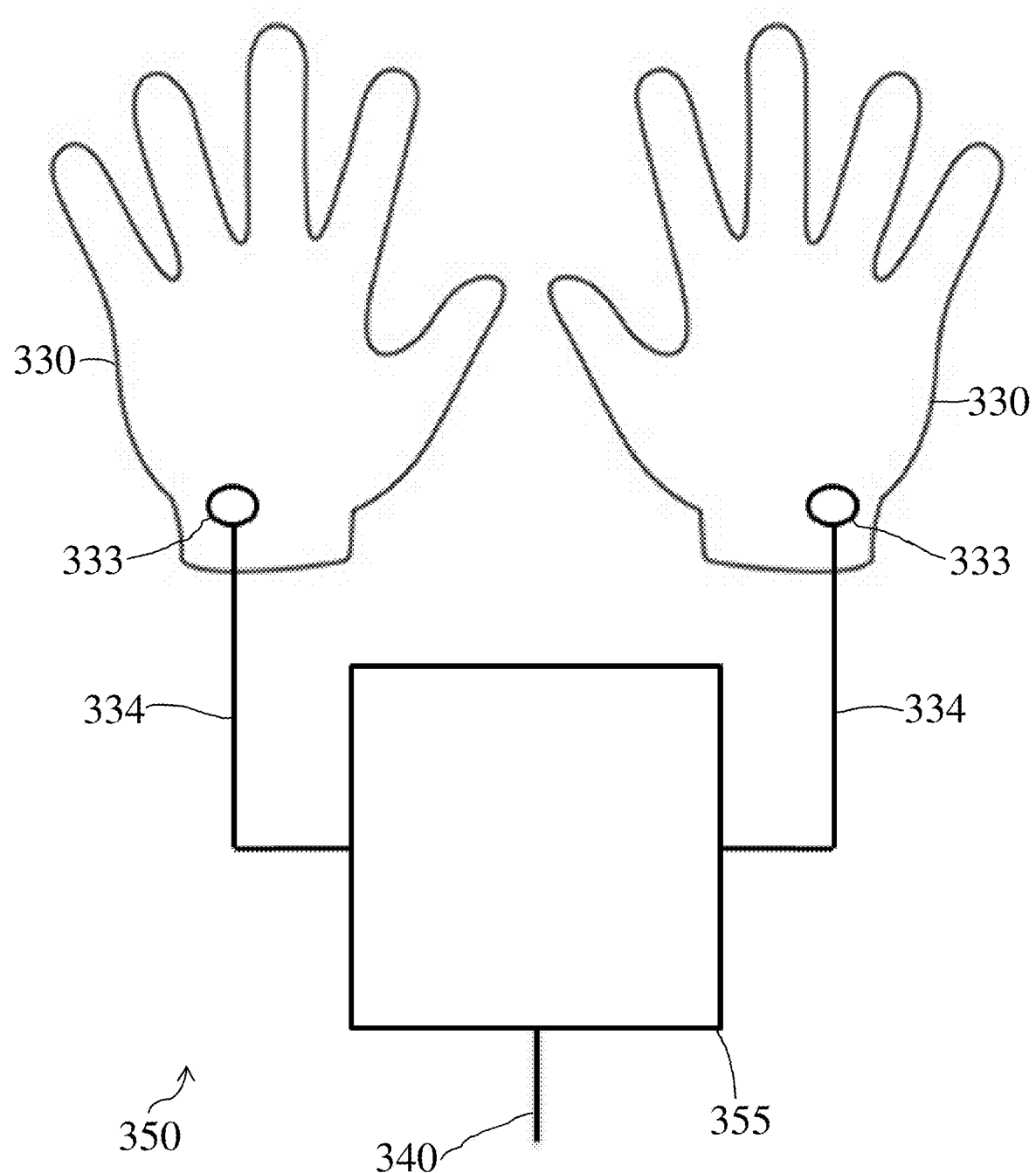
FIG. 13 illustrates an embodiment of a glove system that comprises a device that may mount on, for example, a belt of a user, and allows the user connection to a safety saw.
Figure 14:
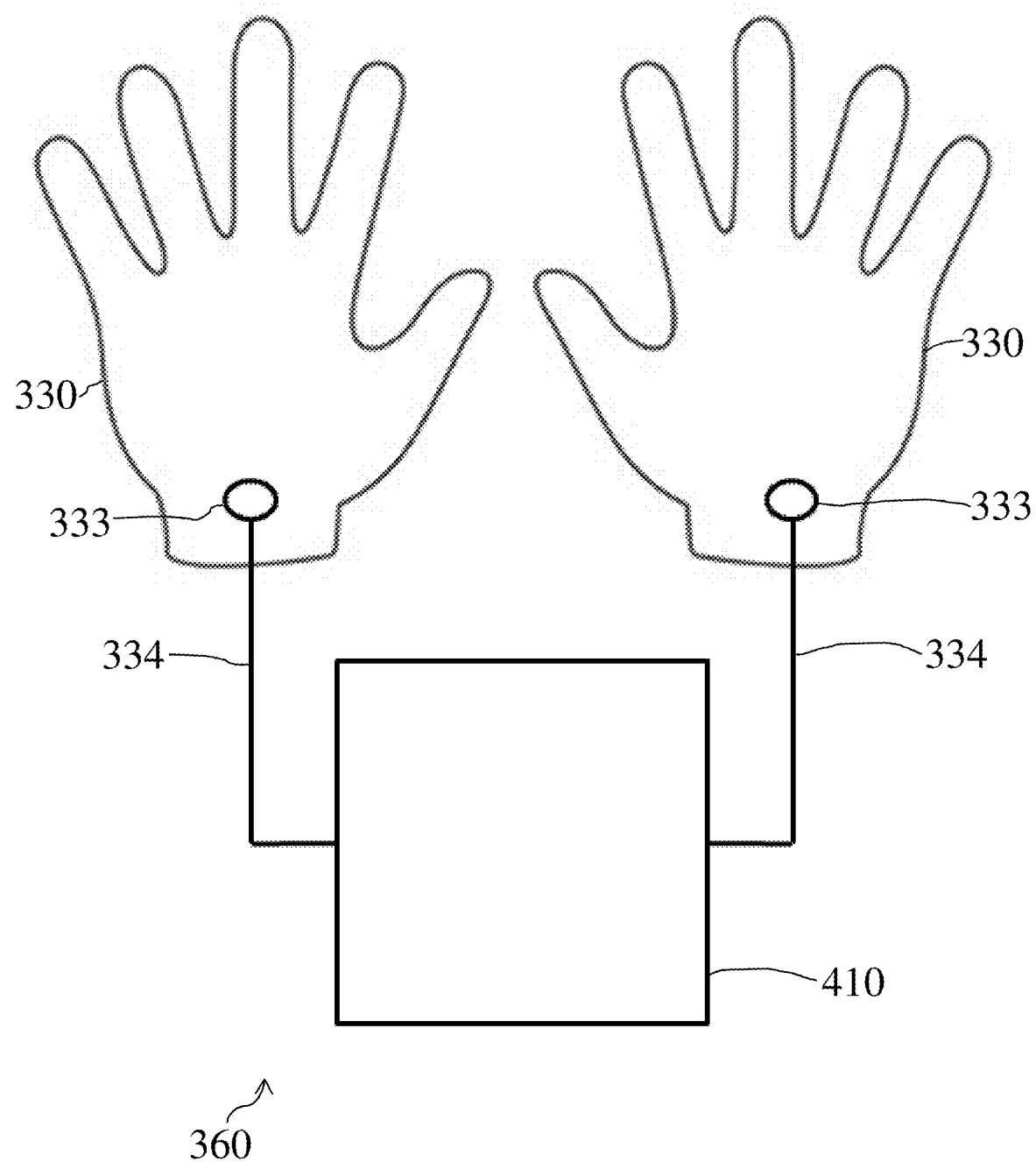
FIG. 14 illustrates another embodiment of a glove system in which gloves are directly connected to a saw monitor system of a safety saw.

With reference to FIGS. 12-14, embodiments of other glove systems that may be used in a safety saw system are described.

To detect an operator while running product, and if a camera should not detect the operator or a colored glove when covered by the product, additional safety measures are necessary.

Accordingly, as illustrated in FIG. 12, an embodiment of the disclosure may include a colored glove 331 and a conductive glove 332 to enable proper connections and insulation, wherein the conductive glove 332 is to be provided under a colored glove 331. Alternatively, the conductive glove 332 and colored glove 331 may be a single glove that is both conductive and colored. Hereinafter, the combination of the conductive glove and the color glove will be referred to as a glove 330. A user may wear a glove 330 on each hand when operating the safety saw 100. Using glove material that are suitable in the electronics and semiconductor industry may provide proper conductivity in the gloves 330.

A glove during initial tests had an ohm reading of 10 k ohms, which is around the same as a human hand. It was found that the voltage drop through this glove was too significant and the machine would not sense it. For example, in an experiment, one sensing's fibers were burned out and would not sense any longer. Thus, in an embodiment of the disclosure, it is preferable that the glove 330 have an ohm reading across the glove 330 at 5 ohms or less. Also, it is preferable to be able to read a voltage in a glove system low enough that a human will not be harmed or feel anything when the glove 330 is conducting to a sensing unit. In order to do this, it may be preferable to have special low voltage inputs on the drive being used, the preferred drive sensing a voltage from 3.5 volts dc and up. This voltage is low enough that a human should not feel the voltage.

As illustrated in FIGS. 13-14, the gloves 330 may also be easily connected to and disconnected from a machine. In order to do this, there may be provided snaps 333 connected to the gloves 330, respectively, and a specialized cable 334 that snaps onto the gloves 330 and plugs into a machine. Since the cable 334 is connected and has a possibility of coming into contact with other voltages, the gloves 330 may be fused with a 30 milliamp fuse. In such an embodiment, it can be easily detected when a fuse blows as the fuses may be visually inspected for breakage and because a circuit including the gloves 330 and the specialized cable 334 may be detected as having an open state when a closed state is expected. The machine may also shutdown if one of or both of the gloves 330 is missing from the circuit.

FIG. 13 illustrates a glove system 350 that comprises a device 355 that may mount on, for example, a belt of a user, and allows the user connection to the safety saw 100. The device 355 may include a processor and memory. The processor may output a user ID, glove status inputs, and other information to a saw, such as the safety saw 100 via a cable 340. The memory may store the user ID, glove status inputs, and the other information.

Figure 15:
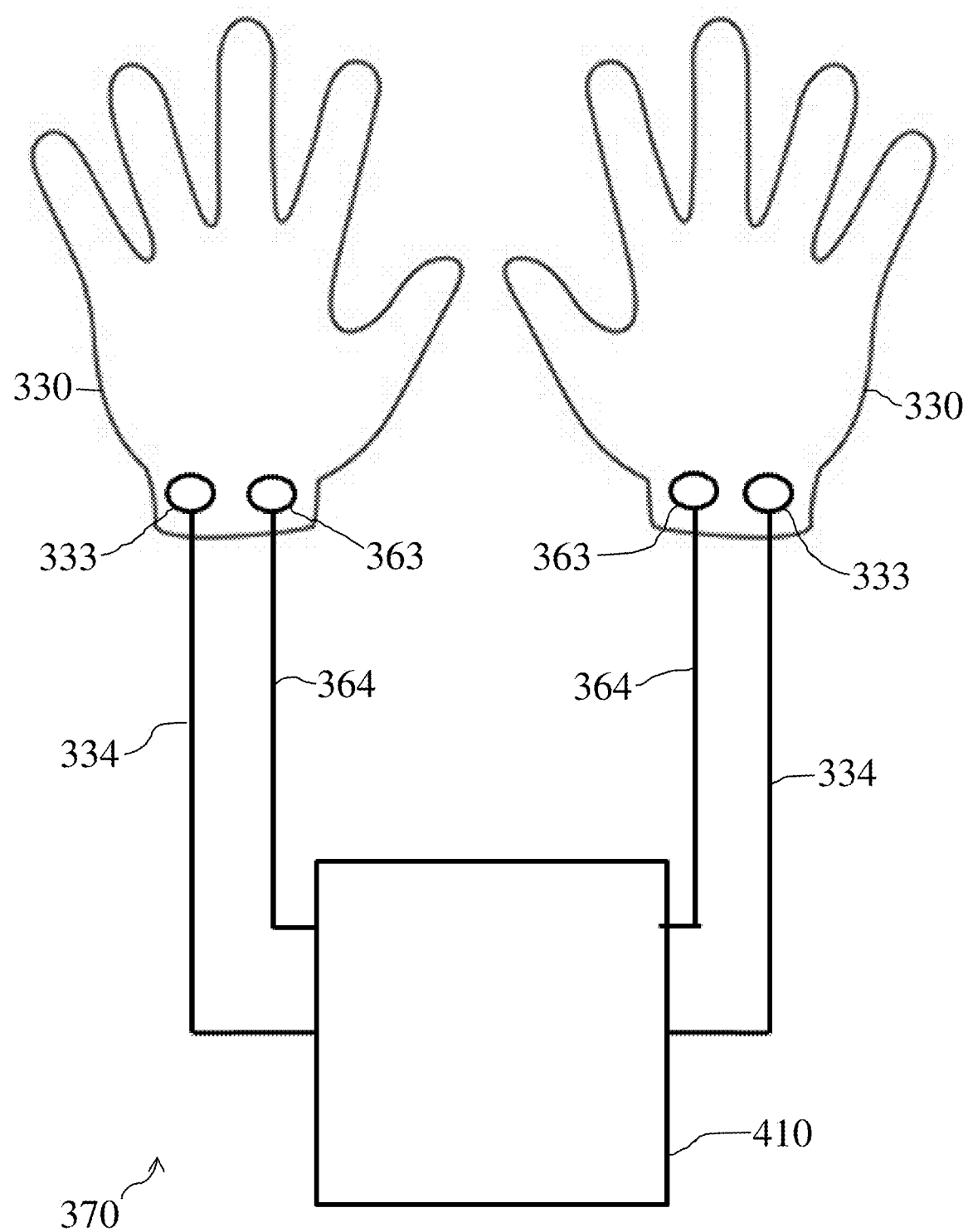
FIG. 15 illustrates another embodiment of a glove system in which gloves include additional connections.

FIG. 14 illustrates a glove system 360 in which the gloves 330 are directly connected to a saw monitor system 410 of a saw, such as safety saw 100. FIG. 15 illustrates a glove system 370 in which the gloves 330 include additional connections 364 that are provided separately from the specialized cable 334 and with additional snaps 363. The additional connections 364 may provide lower resistance than an embodiment with the specialized cables 334 but that does not include the additional connections 364. The additional connections 364 may be redundant. Alternatively, the additional connections 364 may help verify that each glove is on independently. Also, instead of being provided separately from the specialized cable 334, the additional connections may be provided integrally with the specialized cable 334. The specialized cables 334 and additional connections 364 may directly connect the gloves 330 to the saw monitor system 410 of a saw, such as safety saw 100.

By using glove systems such as the ones described in FIGS. 13-15 with, for example, safety saw 100, the safety saw 100 may operate with the same ease as a standard saw in which all operators in plants are currently used to.

In other safety saws in the related art, it takes a great deal of time to start due to P.P.E.'s, mental taxation due do the violence of the stop and erratic stopping or false stopping. Further, the other saws require several pairs of gloves, new boots with no holes, and no perspiration from the operator or moisture in their clothing. The other saws also require the operator to stand on a grate to isolate themselves from any grounding, due to the whole body sensing of the electrode being used.

Saws and control systems of embodiments of this disclosure may use glove systems of this disclosure, such as the ones illustrated in FIGS. 13-15, without the aforementioned issues.

Figure 16:
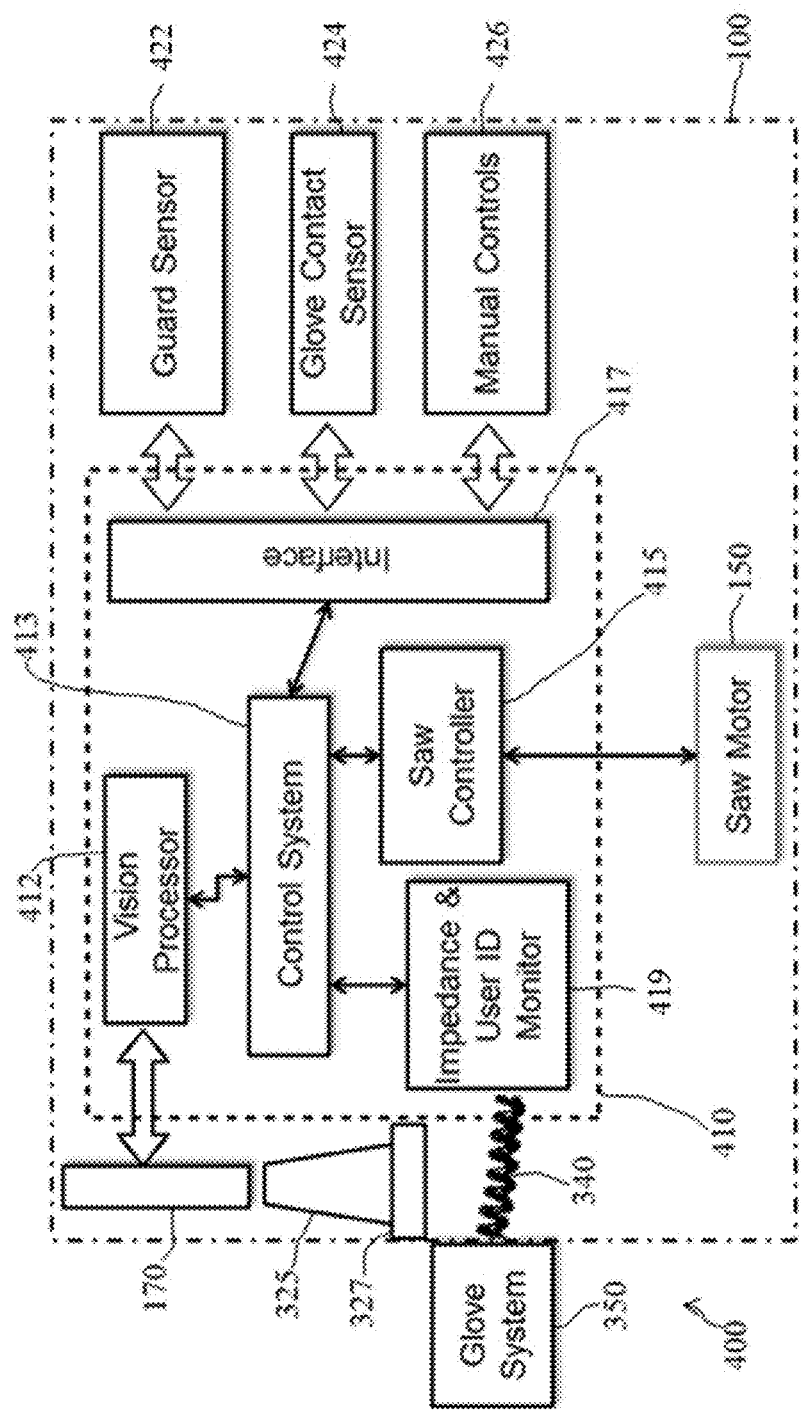
FIG. 16 illustrates a safety saw system of an embodiment.

With reference to FIG. 16, a safety saw system 400 of an embodiment of the disclosure that comprises safety saw 100 is described. Vision systems, such as the vision system illustrated in FIG. 11, may be included in the safety saw system 400. Glove systems, such as the glove systems illustrated in FIGS. 13-15, may also be included in the safety saw system 400.

Safety saw system 400 may comprise the safety saw 100 and a glove system such as, for example, glove system 350. The safety saw 100 may comprise a saw monitor system 410 that includes a vision processor 412, control system 413, saw controller 415, interface 417, and impedance & user ID monitor 419. The saw monitor system 410 may be formed of at least one computer processor and memory. The safety saw 100 may further comprise guard sensor 422, glove contact sensor 424, and manual controls 426. The manual controls may include start and stop buttons and emergency stop buttons.

The glove system 350 may be connected to the saw monitor system 410 by a cable 340 to supply user ID, glove status inputs, and other information to the impedance & user ID monitor 419. The impedance & user ID monitor 419 may determine the identity of a user that uses the glove system 350, based on the supplied user ID or other information supplied by the glove system 350 that indicates a user ID, and may further determine a state of the gloves 330 based on glove status inputs supplied from the glove system 350, including conductivity values.

The camera 170 of the safety saw 100 may supply image data to the vision processor 412, the image data may include images in which the gloves 330, the safety zone 325, the training zone 327, and an optical barcode corresponding to a user ID are captured. The vision processor 412 may determine an identity of a user of the glove system 350 based on detection of an optical barcode provided on gloves 330 of the glove system 350. The vision processor 412 may also determine whether the image data includes a visual cue that suggests a safety issue with respect to a user of the glove system 350 in their use the safety saw 100. For example, the vision processor may determine whether one of the gloves 330 enters within the safety zone 325. The vision processor 412 may also detect whether the camera 170 is covered or faulted. The vision processor 412 and the camera 170 may together be an ultra-high speed vision system wherein the vision processor 412 has a total processing and output time of, for example, around 0.014 s and a buffered output in case a scan misses closing a relay to give a stop signal. Accordingly, unlike other vision sensors and systems tested, the ultra-high speed vision system can cause the safety saw 100 to stop even when an object sensed by the camera 170 is moving fast.

The interface 417 may interface the guard sensor 422, glove contact sensor 424, and the manual controls 426 with the control system 413.

The control system 413 may be connected to the vision processor 412, interface 417, and impedance & user ID monitor 419 to determine whether the safety saw 100 should start or stop operation, based on inputs of the glove system 350, camera 350, and sensors and controls connected to the interface 417.

Operation of the safety saw 100 may be controlled by the control system 413 via the saw controller 415. The saw controller 415 may control operation of the motor 150 that causes movement of the blade 110 of the safety saw 100.

Additionally, the safety saw system 400 may also record all of the positive hard stops of the safety saw 100 and make information concerning safety saw usage viewable to a qualified person such as a supervisor.

Figure 17A:
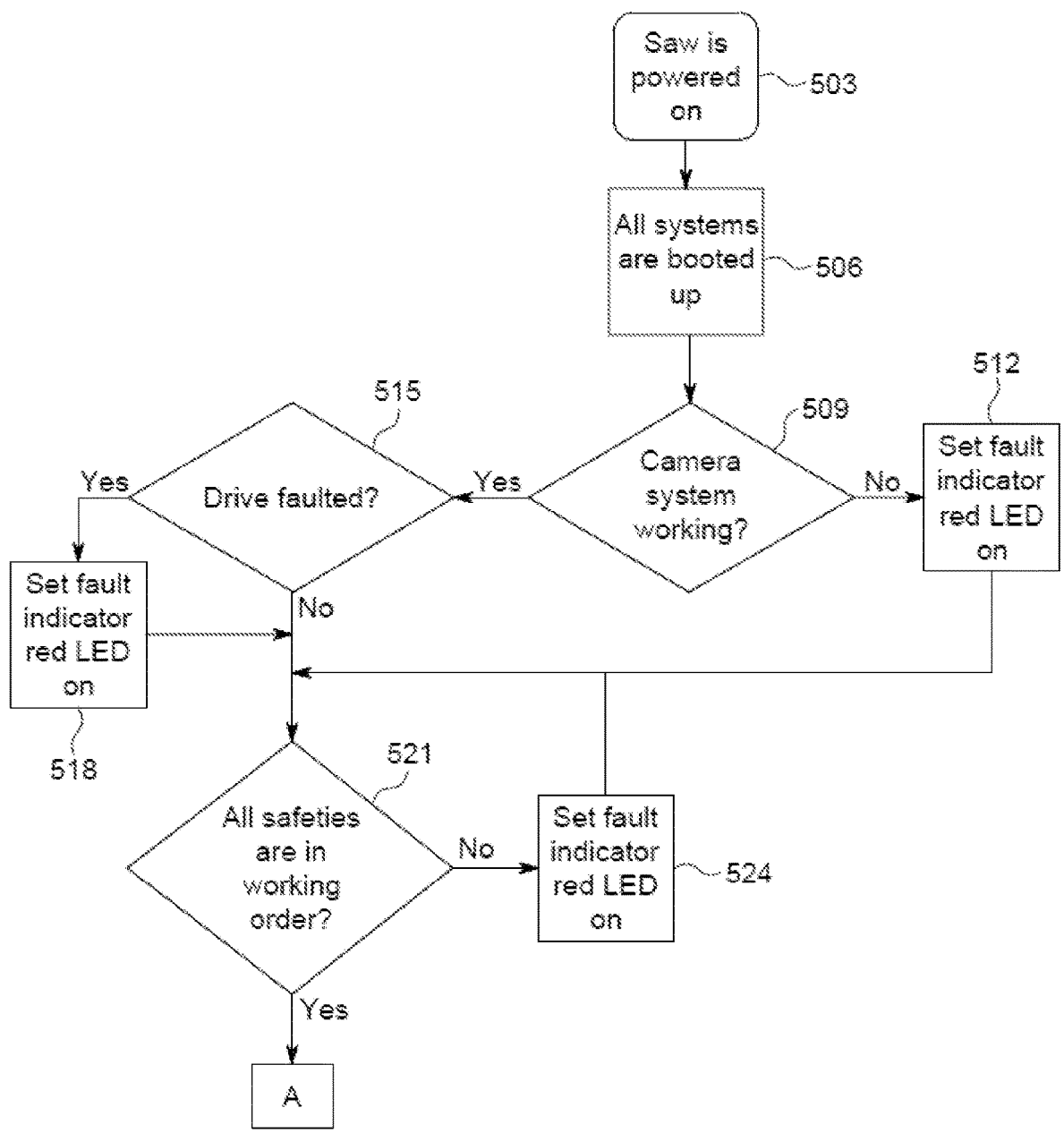
FIG. 17A illustrate a first part of a startup process of an embodiment for checking all systems before starting a saw.
Figure 17B:
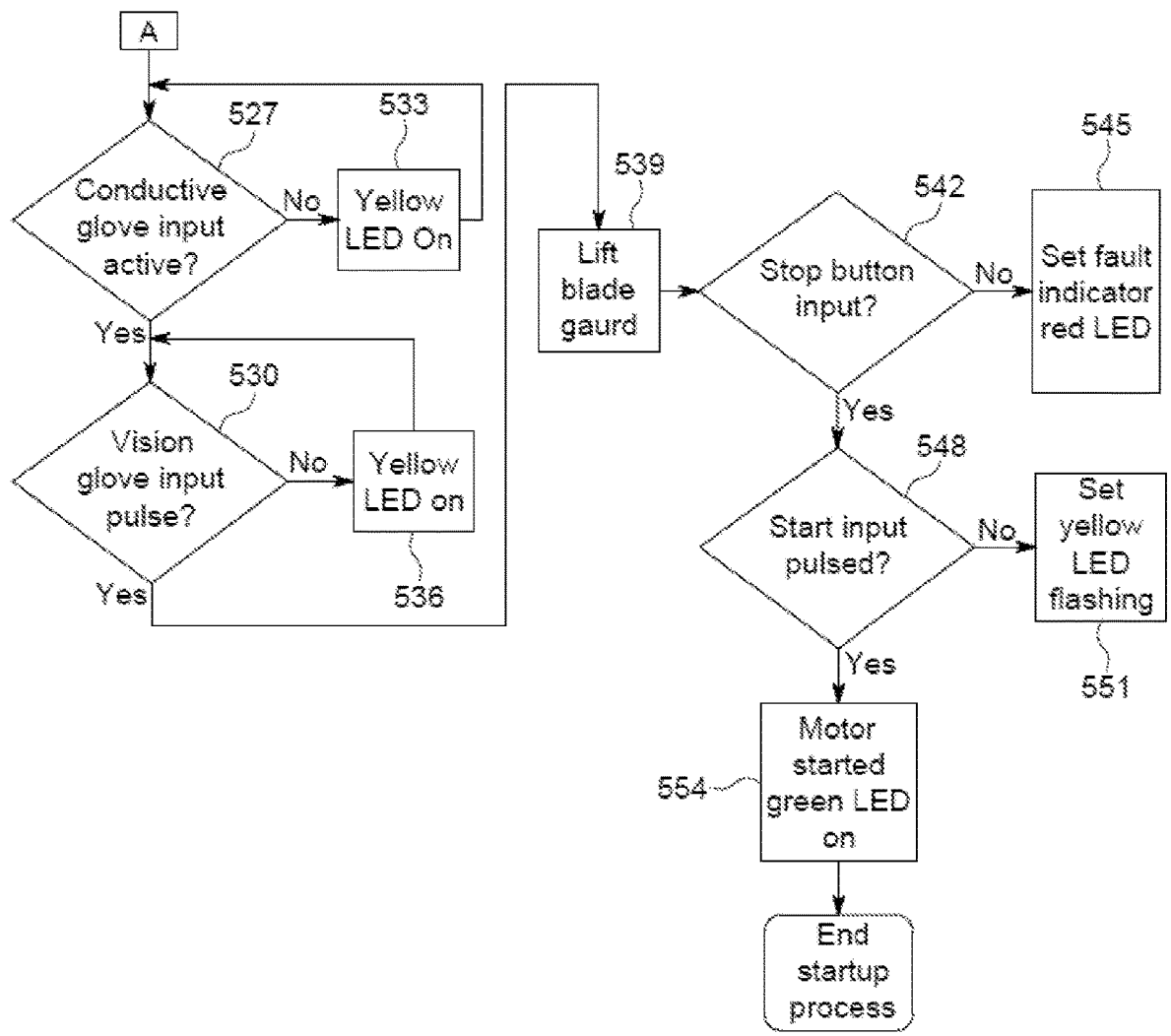
FIG. 17B illustrate a second part of a startup process of an embodiment for checking all systems before starting a saw.

With reference to FIGS. 17A-B, an example startup process of the safety saw system 400 is described.

After the safety saw is powered on (step 503), all systems of the safety saw 100 including the saw monitor system 410 are booted up (step 506). Following, the vision processor 412 determines whether the camera system including the camera 170 is working (step 509). If the camera system is determined to be not working, a fault indicator red LED is set on (step 512) and the saw monitor system 410 checks whether all safeties of the safety saw 100 are determined to be working (step 521). If the camera system is determined to be working, the saw monitor system 410 determines whether a drive of the safety saw 100 is faulted (step 515).

If a drive of the safety saw 100 is determined faulted, a fault indicator red LED is set on (step 518), and the saw monitor system 410 checks whether all safeties of the safety saw 100 are determined working (step 521). If no drives are determined faulted, the safety saw system 410 simply checks whether all safeties of the safety saw 100 are determined to be working (step 521).

If the saw monitor system 410 determines that not all safeties of the safety saw 100 are working, the fault indicator red LED is turned on, if not already on, (step 524) and the process loops until all safeties of the safety saw 100 are determined to be working (step 521).

Once all the safeties are determined working, the saw monitor system 410 determines whether the conductive gloves 332 and the colored gloves 331 of the gloves 330 are detected (steps 527 and 530, respectively). For example, the impedance & user ID monitor 419 may detect whether a signal is outputted from the glove system 350. Also, the vision processor 412 may detect whether camera image data includes at least one of the colored gloves 331. If one of the gloves 331, 332 is not detected, a yellow LED is lit (steps 533 and 536, respectively) and the process loops until the gloves 331, 332 are detected.

Once the conductive gloves 332 and the colored gloves 331 of the gloves 330 are detected, the automatic blade guard 180 is lifted (step 539), and the saw monitor system 410 determines whether a stop button of the manual controls 426 is working (step 542). If no stop button input is received by the control system 413, the fault indicator red LED is turned on (step 545). If a stop button input is received, the saw monitor system 410 then determines whether an input is received by the control system 413 from a start button of the manual controls 426 (step 548).

As long as no input from the start button is received, the yellow led is turned to flashing, thereby signaling the safety saw 100 is idol (step 551). Once an input from the start button is received, the control system 413 controls the saw controller 415 to turn on the motor 150, and a green LED is turned on (step 554). Following, the startup process is ended.

The above-mentioned red, yellow, and green LEDs are not limited to their respective colors and may be any color. Further, the status indicators 140 may be formed to include the above-mentioned LEDs.

Figure 18A:
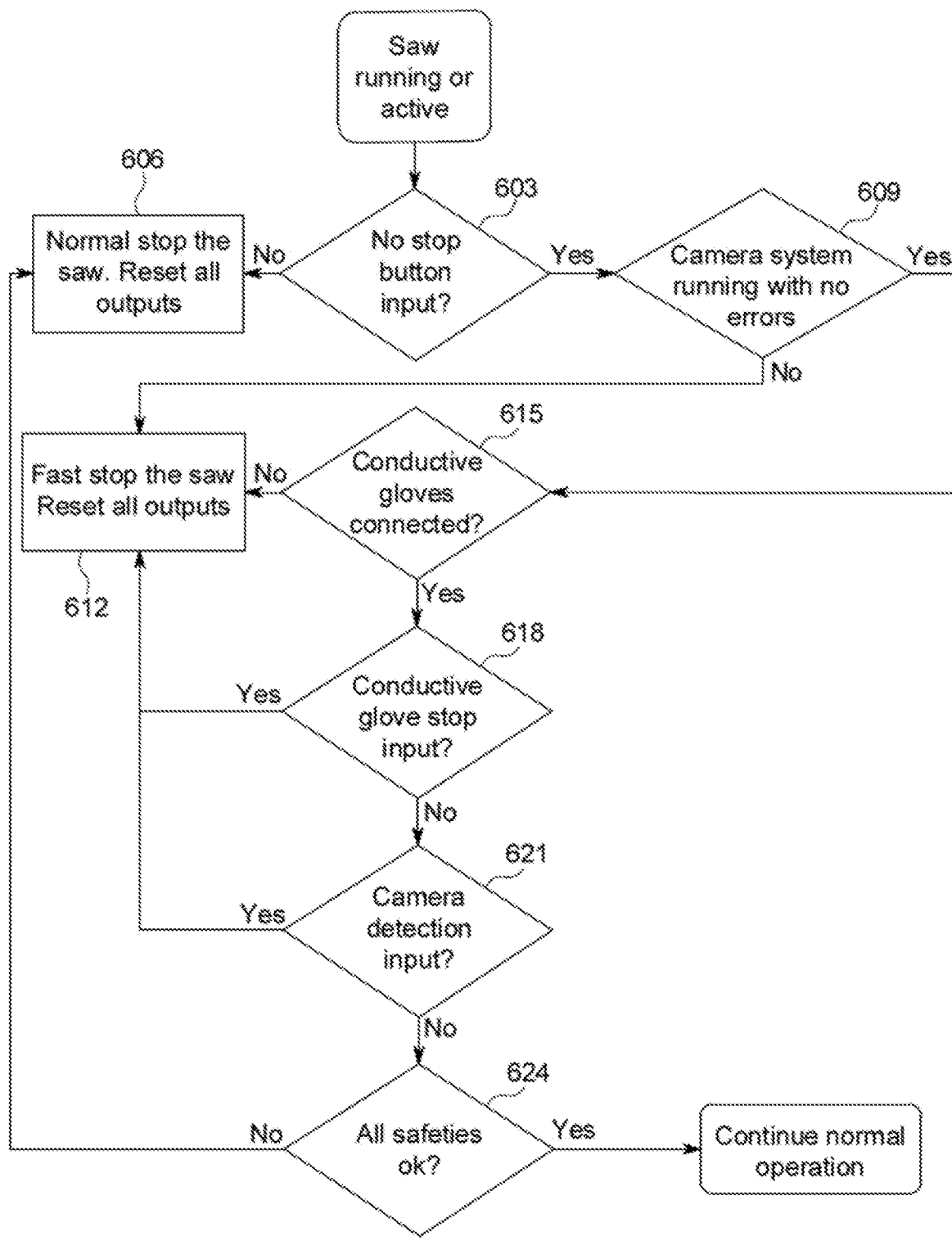
FIG. 18A illustrates a process monitoring loop of an embodiment when a saw is running.
Figure 18B:
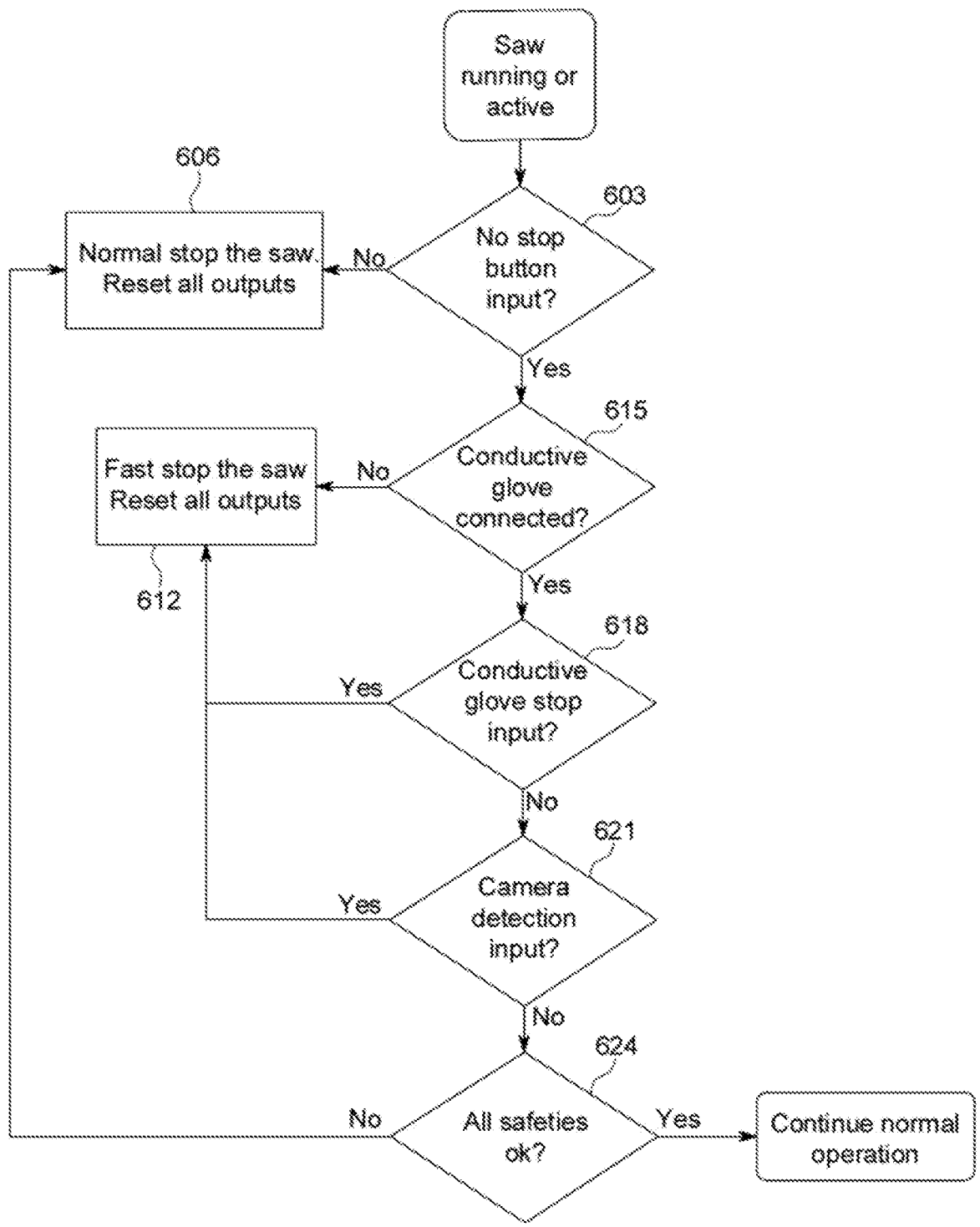
FIG. 18B illustrates a process monitoring loop of another embodiment when the saw is running.
Figure 18C:
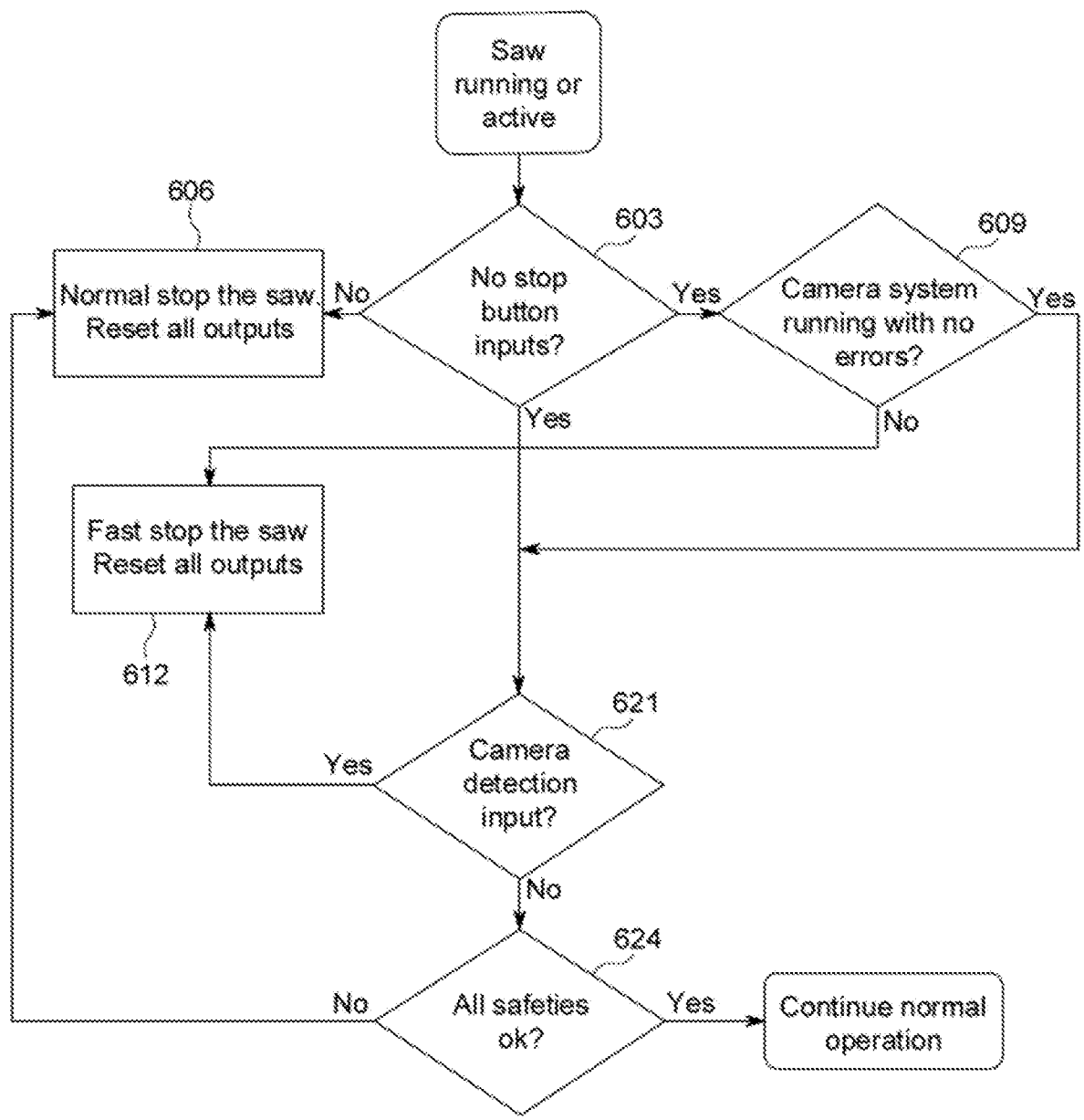
FIG. 18C illustrates a process monitoring loop of another embodiment when the saw is running.

With reference to FIGS. 18A-C, example operations of the safety saw system 400 after the safety saw 100 is started is described. If the camera is blocked with product or otherwise blocked, the camera faults, the saw is stopped, and the guard is lowered.

With reference to FIG. 18A, the saw monitor system 410 checks whether an input from the stop button is received by the control system 413 (step 603). If a stop button input is received, the saw monitor system 410 causes a normal stop of the safety saw 100 and all outputs are reset (step 606). If no stop button input is received, the vision processor 412 determines whether the camera system including the camera 170 is working with no errors (step 609).

If the camera system is determined to be not working with no errors, the saw monitor system 410 causes a fast stop of the safety saw 100 and all outputs are reset (step 612). If the camera system is determined to be working with no errors, the saw monitor system 410 determines whether the conductive gloves 332 are connected to the saw monitor system 410 (step 615). For example, the impedance & user ID monitor 419 may detect whether a signal is outputted from the glove system 350.

If at least one of the conductive gloves 332 are determined to not be connected, the saw monitor system 410 causes a fast stop of the safety saw 100 and all outputs are reset (step 612). Otherwise, the saw monitor system 410 determines whether a stop input is received by the impedance & user ID monitor 419 from the glove system 350 (step 618). For example, the glove system 350 may output a stop signal if one of the gloves 332 in the glove system 350 touches the blade 110.

If a stop input is received, the saw monitor system 410 causes a fast stop of the safety saw 100 and all outputs are reset (step 612). Otherwise, the saw monitor system 410 determines whether a camera detection input is received by the vision processor 412 from the camera 170 that indicates a stop condition (621). For example, the vision processor 412 may determine whether one of the gloves 330 enters within the safety zone 325.

If the camera detection input is received, the saw monitor system 410 causes a fast stop of the safety saw 100 and all outputs are reset (step 612). Otherwise, the saw monitor system 410 may determine whether all safeties of the safety saw system 400 are OK (step 624).

If at least one of the safeties of the safety saw system 400 is not OK, the saw monitor system 410 causes a normal stop of the safety saw 100 and all outputs are reset (step 606). Otherwise, normal operation continues.

The saw may function normally until stopped with a shutoff such as, for example, the emergency stop 192 or emergency kick stop 194 illustrated in FIG. 1.

When normal or fast stop occurs, the control system 413 controls the saw controller 415 to turn off the motor 150, and the automatic blade guard 180 is lowered.

With reference to FIGS. 18B-C, alternative example operations of the safety saw system 400 after the safety saw 100 is started is described. As illustrated in FIG. 18B, if no stop button input is received, the saw monitor system 410 determines whether the conductive gloves 332 are connected to the saw monitor system 410 (step 615). Accordingly, unlike the embodiment illustrated in FIG. 18A, the saw monitor system 410 does not determine whether the camera system including the camera 170 is working with no errors. As illustrated in FIG. 18C, the safety saw system 400 may operate without electrically conductive gloves. That is, the saw monitor system 410 does not check whether the conductive gloves 332 are connected to the saw monitor system 410, and further does not check whether a stop input is received by the impedance & user ID monitor 419 from the glove system 350.

As the safety saw 100 runs, the safety saw system 400 may record operator statistics enabling tracking of performance, safety, and fatigue statistics. FIGS. 19 and 20 illustrate information of zones and performance that may be recorded by a safety saw system for performance and safety rating purposes.

Figure 21:
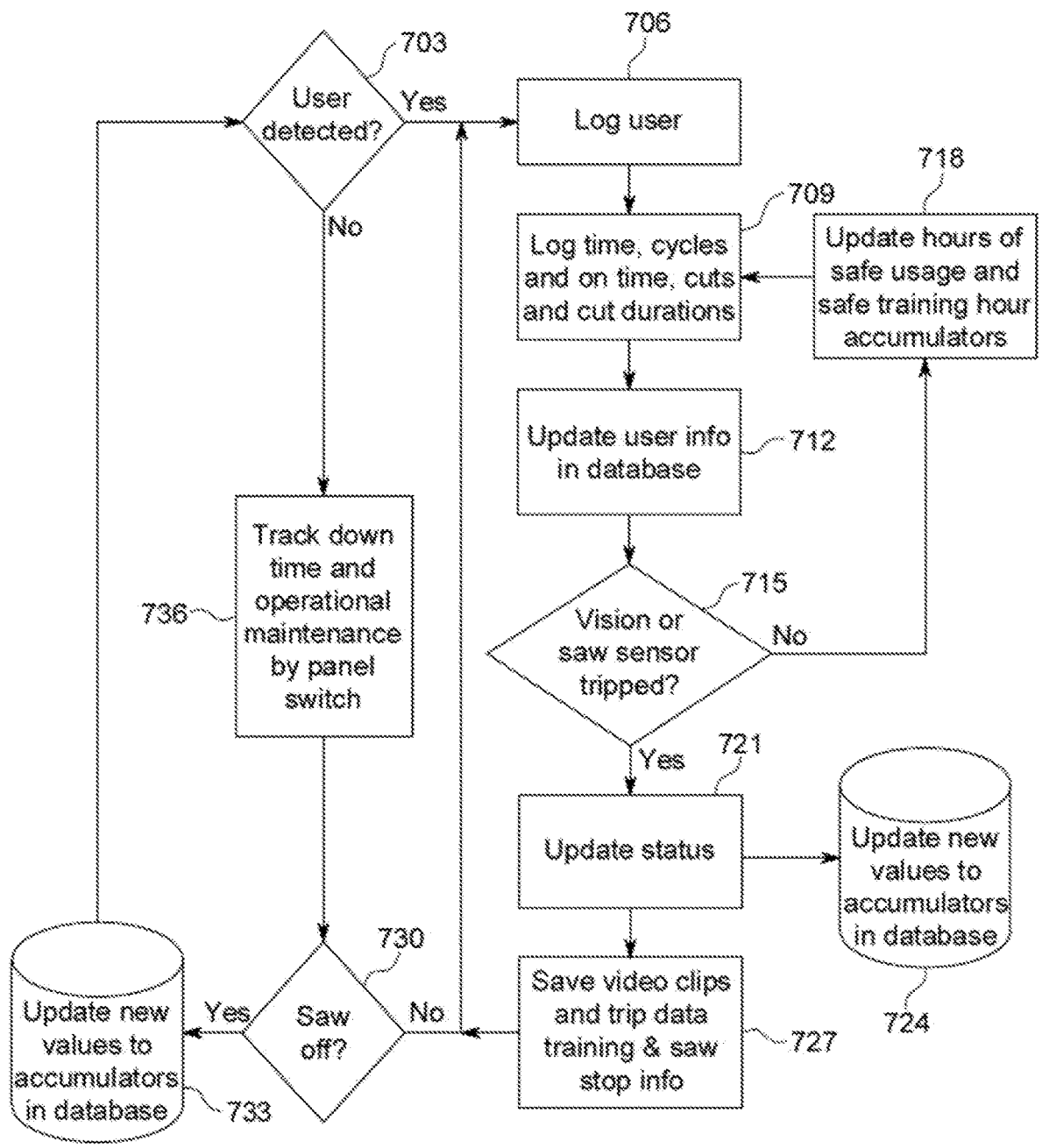
FIG. 21 illustrates a data tracking method of the safety saw system.

With reference to FIG. 21, a data tracking method of the safety saw system 400 is described which performs identifying and storing user information for a user ID in conjunction with both training information and saw stop information to build safety and performance statistics for the saw monitor system 410 and the user.

The saw monitor system 410 may determine whether a user of a glove system, such as glove system 350, is detected (step 703). If no user is detected, when the guard is down and the system is idle, the control system 413 may accumulate the time the safety saw 100 is not in use by time of day buckets for statistics (e.g. 10-11 am 10 minutes 22 seconds). The switches on the access panels and guards may be used to track maintenance and cleaning times and the accumulator's may also track these times for maintenance and cleaning by tracking various inputs on the access panels and guards (step 736). Following, the saw monitor system 410 may determine whether the safety saw 100 is off (step 630). If a user is detected, the user is logged (step 706); the time of logging, cycles and on time of the safety saw system 400 during the user's operation of the safety saw system 400, and cuts and cut durations of the safety saw 100 by the user are logged (step 709); and such information of the user is updated in a database (step 712). The database may be provided in the memory of the saw monitor system 410 or externally in, for example, a cloud computing environment or an externally provided memory device.

Following, the saw monitor system 410 may determines whether a vision or saw sensor is tripped (step 715). For example, the saw monitor system 410 may determine that a vision sensor is tripped when a camera detection input is received by the vision processor 412 from the camera 170 that indicates a stop condition. Further, the saw monitor system 410 may determine a saw sensor is tripped when a stop input is received by the impedance & user ID monitor 419 from the glove system 350.

If neither a vision or saw sensor is determined tripped, the saw monitor system 410 may update hours of safe usage and safe training hour accumulators for the user (step 718). Following, the saw monitor system 410 returns to step 709.

If at least one of a vision or saw sensor is determined tripped, the saw monitor system 410 may update a status of the user in the database (step 721). For example, the saw monitor system 410 may record information concerning the user's interactions with safety zone 325 and training zone 327 and information concerning the gloves 330 when they touch the blade 110 of the safety saw 100. The saw monitor system 410 may then store values of such information to accumulators within the database (step 724). The saw monitor system 410 may also save video clips, vision or saw sensor trip data, and saw stop information within the memory of the saw monitor system 410, or externally in, for example, a cloud computing environment or an externally provided memory device (step 727).

Following, saw monitor system 410 may determine whether the safety saw 100 is off (step 730). If the safety saw 100 is determined off, the saw monitor system 410 may then store values of operation information to accumulators within the database (step 733) and return to step 703. If the safety saw 110 is determined on, the saw monitor system 410 returns to step 706.

Figure 22:
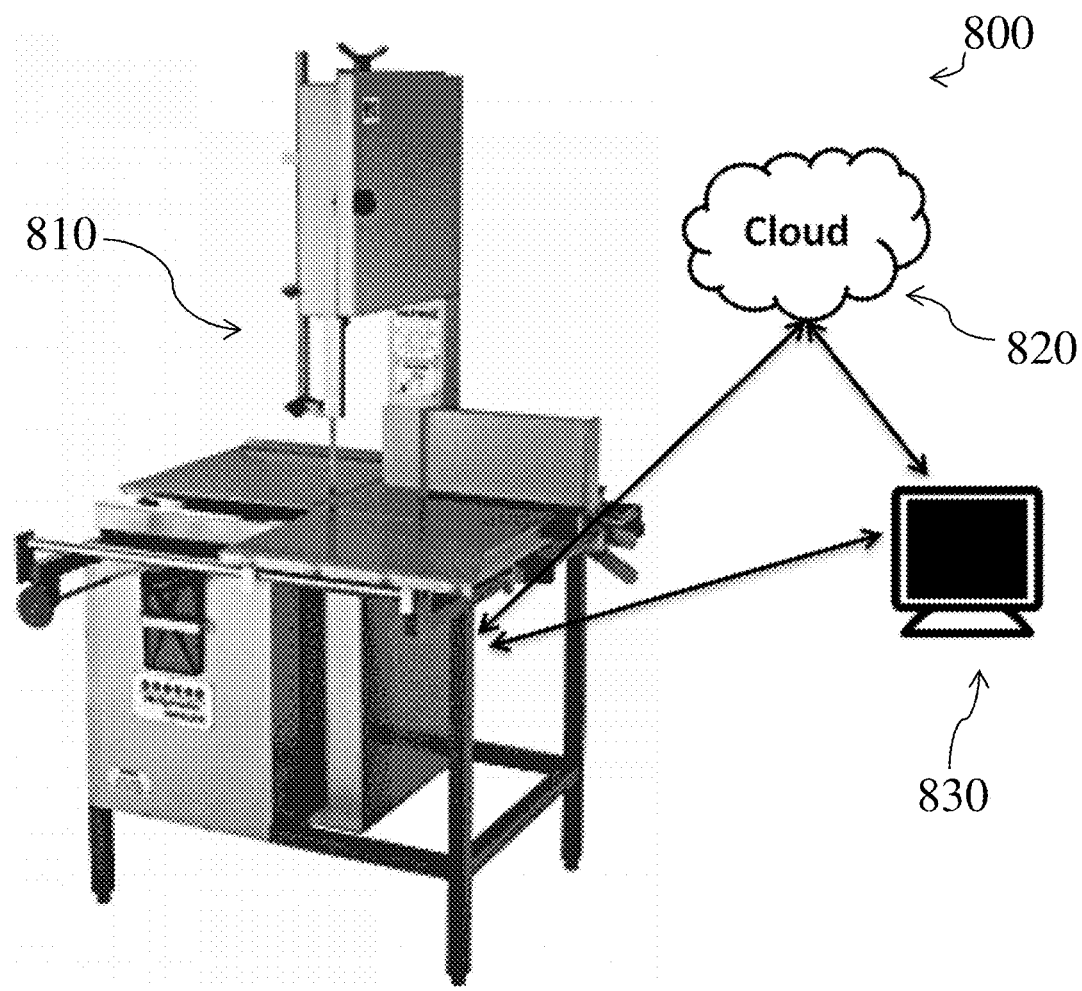
FIG. 22 illustrates an embodiment in which a saw has connectivity.

FIG. 22 illustrates an embodiment of a saw system 800 that includes a saw 810 that has connectivity to a cloud computing environment 820 and a display device 830.

Monitoring the performance statistics is very productive when the data is gathered from many sites. For example, site data can be compared and become valuable to a larger population of users. The safety and performance data as shown in FIG. 19 and FIG. 20 enable ranking and safety ratings for operators. Such data may be collected by the saw system 800. The saw 810 may be IP addressable and have Ethernet and WiFi capability. The saw 810 may be controlled by an attached computer such as a CPU with memory, such as ROM or RAM having computer executable instructions written therein. Alternatively, the saw may be controlled by computing resources distributed in a cloud computing environment 820. The cloud based statistics and training enable an application on a display device 830, such as a PC, mobile device, or tablet, to show each manager the operator data for evaluations, training and propensity for safe operation. All together this enables a safer saw, a safer environment, informed management, informed operators and overall method of safe operating ecosystem.

According to embodiments discussed and described above, it becomes possible to quickly stop a saw while avoiding damage to particular components. Furthermore, it is possible to stop the saw without significant injury to a user, even if the user directly touches the blade of the saw with a conductive glove.

Additionally, because the entire drive system and braking system is electronic in an embodiment, the machinery may be restarted quickly after an automatic-stop is triggered. For example, after an automatic-stop event, the user need only push a button to reset the system, show the glove to a camera to confirm it is safe to proceed, and resume cutting. It is emphasized that due to the rapid stopping time, the blade 110 of the saw is not significantly damaged even though it may make physical contact with the conductive glove.

It should be noted that although a few embodiments have been described, those skilled in the art will readily appreciate that many modifications are possible to the embodiments without materially departing from the novel teachings and advantages of the embodiments. Accordingly, all such modifications are intended to be included within the scope of the embodiments as shall be defined in the claims. Therefore, it is to be understood that the foregoing is illustrative of various embodiments and is not to be construed as limited to the specific embodiments illustrated. For example, it should be noted that while the upper and lower wheels according to an embodiment are made of aluminum, other low-weight materials suitable may be employed, such as carbon fiber or ceramic having appropriate material properties suitable for the application. Furthermore, the number and design of spokes can be optimized to reduce inertia. Furthermore, blade wipers may be installed at various points in the saw to keep the blade clean and prevent the work product from intruding into the blade-wheel interface where it could act as lubricant and reduce friction.

The invention claimed is:

1. A machine comprising:
a motor;
a first wheel coupled to the motor;
a second wheel; and
a blade,
wherein
the first wheel and the second wheel each comprise a first lip and a second lip sandwiching a groove therebetween,
the first wheel is formed of an anodized main body with a non-anodized surface extending along the circumference of the groove of the first wheel,
the blade is wrapped around the first wheel and the second wheel such that the blade is positioned within the groove of the first wheel and within the groove of the second wheel, and the blade directly contacts the non-anodized surface of the first wheel,
the blade comprises a base part and a toothed part, the toothed part being for cutting,
an entire width of the non-anodized surface of the first wheel is equal to or less than a width of the base part, and a side of the base part is in direct contact with the non-anodized surface, and
the non-anodized surface of the first wheel is directly adjacent to an anodized surface of the groove of the first wheel, extending along the circumference of the groove.

2. A safety saw system comprising:
a motor;
a first wheel coupled to the motor;
a second wheel;
a blade;
a detector; and
a controller,
wherein
the first wheel and the second wheel each comprise a first lip and a second lip sandwiching a groove therebetween,
the first wheel is formed of an anodized main body with a non-anodized surface extending along a circumference of the groove of the first wheel,
the blade is wrapped around the first wheel and the second wheel such that the blade is positioned within the groove of the first wheel and within the groove of the second wheel,
the controller is configured to stop the motor in response to an input to the detector indicating an abnormal condition of the safety saw system, and the non-anodized surface of the first wheel is integrally formed with the anodized main body of the first wheel, such that the non-anodized surface is a surface of the anodized main body that is formed of a same metal as the anodized main body.

3. The system of claim 2, further comprising a dynamic braking device which stops the motor in response to the input.

4. The system of claim 3, wherein the dynamic braking device stops the blade in 70 ms or less.

5. The system of claim 2, wherein the motor is coupled to the first wheel through a direct drive.

6. The system of claim 2, wherein the detector comprises a sensor configured to detect a conductive glove making contact with the blade.

7. The system of claim 6, wherein the conductive glove has a resistance lower than body resistance or resistance of meat.

8. A method of stopping a saw comprising a motor; a first wheel coupled to the motor; a second wheel; a blade, a detector; and a controller, wherein the first wheel and the second wheel each comprise a first lip and a second lip sandwiching a groove therebetween, the first wheel is formed of an anodized main body with a non-anodized surface extending along the circumference of the groove of the first wheel, and the blade is wrapped around the first wheel and the second wheel such that the blade is positioned within the groove of the first wheel and within the groove of the second wheel, and the blade directly contacts the non-anodized surface of the first wheel, the non-anodized surface of the first wheel being integrally formed with the anodized main body of the first wheel, such that the non-anodized surface is a surface of the anodized main body that is formed of a same metal as the anodized main body, the method comprising:
  stopping the motor in response to an input to the detector indicating an abnormal condition of the saw.

9. The method of claim 8, wherein the detector comprises a sensor configured to detect a conductive glove making contact with the blade, the method further comprising:
  determining the conductive glove is on a body of a user by reading body resistance.

10. The method of claim 8, wherein the detector comprises a camera configured to detect presence of a glove in a predetermined region, the method further comprising:
  identifying regions of travel of the glove;
  determining regions of safety movement; and
  stopping the motor in response to the glove entering the predetermined region, the predetermined region being apart from the regions of safety movement.

11. A method, comprising:
  the method of stopping the saw of claim 8; and
  calculating a plurality of safety rankings corresponding to a plurality of users by ID,
    wherein the safety rankings are based on safety parameters measured by the controller.

12. The method of claim 8, further comprising
  dropping a saw guard that protects the user from the blade.

13. The system of claim 2, further comprising a saw guard that protects the user from the blade.

14. The system of claim 2, wherein the anodized main body of the first wheel and the non-anodized surface of the first wheel are formed of aluminum.

15. The system of claim 2, wherein
  the second wheel is formed of an anodized main body with a non-anodized surface extending along the circumference of the groove of the second wheel, and
  the blade directly contacts the non-anodized surface of the second wheel.

16. The system of claim 15, wherein the anodized main body of the second wheel and the non-anodized surface of the second wheel are formed of aluminum.

17. The system of claim 2, wherein
  the blade comprises a base part and a toothed part, the toothed part being for cutting, and
  an entire width of the non-anodized surface of the first wheel is equal to or less than a width of the base part, and a side of the base part is in direct contact with the non-anodized surface.

18. The system of claim 17, wherein
  the entire width of the non-anodized surface of the first wheel is equal to the width of the base part, and the side of the base part is in direct contact with the non-anodized surface along an entire width of the base part.

19. The system of claim 17, wherein
  the entire width of the non-anodized surface of the first wheel is less than the width of the base part, and the side of the base part is in direct contact with the non-anodized surface along a partial width of the base part.

20. The system of claim 2, wherein
  the blade comprises a base part and a toothed part, the toothed part being for cutting,
  an entire width of the non-anodized surface of the first wheel is greater than a width of the base part,
  a side of the base part is in direct contact with the non-anodized surface along an entire width of the base part, and
  a side of the toothed part is in direct contact with the non-anodized surface at least along a partial width of the toothed part.

* * * * *